US011910408B2

(12) United States Patent
Wang et al.

(10) Patent No.: US 11,910,408 B2
(45) Date of Patent: Feb. 20, 2024

(54) SIDELINK CANCELLATION FOR OUT OF COVERAGE USER EQUIPMENT

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 17/358,300

(22) Filed: Jun. 25, 2021

(65) Prior Publication Data

US 2022/0417905 A1    Dec. 29, 2022

(51) Int. Cl.
*H04W 72/30* (2023.01)
*H04W 72/23* (2023.01)

(52) U.S. Cl.
CPC .......... *H04W 72/30* (2023.01); *H04W 72/23* (2023.01)

(58) Field of Classification Search
CPC ...... H04W 72/23; H04W 72/30; H04W 72/40
See application file for complete search history.

(56) References Cited

U.S. PATENT DOCUMENTS

| 9,930,709 | B2 * | 3/2018 | Tu | H04W 76/14 |
|---|---|---|---|---|
| 10,219,291 | B2 * | 2/2019 | Pelletier | H04W 76/14 |
| 10,237,912 | B2 * | 3/2019 | Agiwal | H04W 76/36 |
| 10,264,595 | B2 * | 4/2019 | Li | H04W 48/16 |
| 10,368,379 | B2 * | 7/2019 | Tu | H04W 74/0833 |
| 10,555,271 | B2 * | 2/2020 | Classon | H04W 56/001 |
| 10,912,107 | B2 * | 2/2021 | Li | H04W 48/16 |
| 11,272,489 | B2 * | 3/2022 | Li | H04L 1/1861 |
| 11,582,782 | B2 * | 2/2023 | Pelletier | H04L 1/1822 |
| 11,601,916 | B2 * | 3/2023 | Gulati | H04B 17/318 |
| 2013/0322413 | A1 * | 12/2013 | Pelletier | H04W 76/14 370/336 |
| 2016/0029359 | A1 * | 1/2016 | Agiwal | H04W 36/03 370/329 |

(Continued)

FOREIGN PATENT DOCUMENTS

| CA | 3033386 | A1 * | 2/2018 | ........... H04L 5/0032 |
|---|---|---|---|---|
| CA | 2957235 | C * | 3/2023 | ........... H04W 72/02 |

(Continued)

*Primary Examiner* — Eric Nowlin
(74) *Attorney, Agent, or Firm* — Holland & Hart LLP

(57) ABSTRACT

Methods, systems, and devices for wireless communications are described that support sidelink cancellation for out of coverage user equipment. Described techniques provide for signaling of cancellation indications to a user equipment (UE) or a group of UEs to refrain from performing sidelink communications on a set of resources. A base station may transmit a cancellation indication to one or more sidelink UEs via an access link that indicates that an allocation of one or more resources for sidelink communications has been canceled. A first UE may receive the cancellation indication from the base station via the access link and transmit a sidelink communication to one or more other UEs that indicates the canceled resource allocation. Based on the sidelink communication of the cancellation indication from the first UE, the one or more other UEs may refrain from transmitting using the canceled resources.

27 Claims, 17 Drawing Sheets

(56) References Cited

U.S. PATENT DOCUMENTS

| | | | |
|---|---|---|---|
| 2016/0044729 A1* | 2/2016 | Tu | H04W 74/0833 370/329 |
| 2016/0073408 A1* | 3/2016 | Sartori | H04W 72/0453 370/329 |
| 2016/0142991 A1* | 5/2016 | Classon | H04W 56/001 370/350 |
| 2018/0176935 A1* | 6/2018 | Li | H04W 72/23 |
| 2018/0199389 A1* | 7/2018 | Tu | H04W 74/0833 |
| 2018/0234994 A1* | 8/2018 | Yasukawa | H04W 4/70 |
| 2019/0191452 A1* | 6/2019 | Pelletier | H04L 1/1822 |
| 2019/0200374 A1* | 6/2019 | Li | H04W 72/569 |
| 2019/0297658 A1* | 9/2019 | Tu | H04W 74/04 |
| 2021/0144681 A1* | 5/2021 | Gulati | H04W 24/08 |
| 2021/0168790 A1* | 6/2021 | Li | H04L 1/1893 |
| 2021/0212049 A1* | 7/2021 | Yang | H04L 1/1812 |
| 2021/0243726 A1* | 8/2021 | Osawa | H04W 72/20 |
| 2021/0337512 A1* | 10/2021 | Belleschi | H04W 28/26 |
| 2022/0070890 A1* | 3/2022 | Hosseini | H04W 72/1263 |
| 2023/0050943 A1* | 2/2023 | Luo | H04W 72/542 |
| 2023/0122730 A1* | 4/2023 | Guo | H04W 72/21 370/329 |
| 2023/0131862 A1* | 4/2023 | Xue | H04W 28/0273 370/329 |
| 2023/0224932 A1* | 7/2023 | Hwang | H04W 74/0808 370/329 |

FOREIGN PATENT DOCUMENTS

| | | | | |
|---|---|---|---|---|
| CN | 106576368 A | * | 4/2017 | H04W 72/02 |
| CN | 110089183 A | * | 8/2019 | H04W 48/16 |
| CN | 110958689 A | * | 4/2020 | H04L 1/1812 |
| CN | 106576368 B | * | 9/2020 | H04W 72/02 |
| CN | 112074018 A | * | 12/2020 | H04W 72/02 |
| CN | 112135359 A | * | 12/2020 | H04W 72/02 |
| CN | 110958689 B | * | 5/2022 | H04L 1/1812 |
| CN | 110089183 B | * | 6/2022 | H04W 48/16 |
| CN | 115380621 A | * | 11/2022 | H04W 72/0406 |
| CN | 115462171 A | * | 12/2022 | H04W 28/0273 |
| EP | 3195685 B1 | * | 7/2020 | H04W 72/02 |
| EP | 3731589 A1 | * | 10/2020 | H04W 72/02 |
| EP | 2856823 B1 | * | 11/2020 | H04L 1/1822 |
| EP | 3796740 A1 | * | 3/2021 | H04L 1/1822 |
| EP | 3560263 B1 | * | 8/2021 | H04W 48/16 |
| EP | 3860272 A1 | * | 8/2021 | H04L 1/1812 |
| EP | 3860272 A4 | * | 12/2021 | H04L 1/1812 |
| EP | 3731589 B1 | * | 4/2023 | H04W 72/02 |
| ES | 2888127 T3 | * | 12/2021 | H04W 48/16 |
| JP | 2017527202 A | * | 9/2017 | |
| JP | 6449987 B2 | * | 1/2019 | H04W 72/02 |
| JP | 2022501942 A | * | 1/2022 | |
| JP | 7125551 B2 | * | 8/2022 | H04L 1/1812 |
| KR | 20160011339 A | * | 2/2016 | |
| KR | 102212819 B1 | * | 2/2021 | |
| KR | 20170042312 A | * | 4/2021 | |
| KR | 20210070197 A | * | 6/2021 | |
| KR | 102445061 B1 | * | 9/2021 | |
| KR | 102437361 B1 | * | 8/2022 | |
| TW | 201622459 A | * | 6/2016 | H04W 72/02 |
| WO | WO-2013139041 A1 | * | 9/2013 | H04W 72/082 |
| WO | WO-2013181515 A2 | * | 12/2013 | H04L 1/1822 |
| WO | WO-2016022716 A1 | * | 2/2016 | H04W 72/02 |
| WO | WO-2018118340 A1 | * | 6/2018 | H04W 48/16 |
| WO | WO-2020063472 A1 | * | 4/2020 | H04L 1/1812 |
| WO | WO-2021092365 A1 | * | 5/2021 | H04B 17/318 |
| WO | WO-2021098126 A1 | * | 5/2021 | H04W 72/0406 |
| WO | WO-2022051772 A1 | * | 3/2022 | H04W 28/26 |

* cited by examiner

SIDELINK CANCELLATION FOR OUT OF COVERAGE USER EQUIPMENT

FIELD OF TECHNOLOGY

The following relates to wireless communications, including sidelink cancellation for out of coverage user equipment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support both access link and sidelink communications between devices. An access link refers to a communication link between a UE and a network node (e.g., a base station), and in some cases may be referred to as a Uu interface. Specifically, the Uu interface may refer to an over-the-air interface for downlink transmissions, uplink transmissions, or both. A sidelink refers to a communication link between similar devices (e.g., between multiple UEs) and in some cases may be referred to as a PC5 interface. For example, a sidelink may support communications between multiple UEs (e.g., in a vehicle-to-everything (V2X) system, a vehicle-to-vehicle (V2V) system, a device-to-device (D2D) system, among other examples). Efficient and reliable techniques for managing access link communication and sidelink communications enhance network efficiency and reliability.

SUMMARY

The described techniques relate to improved methods, systems, devices, and apparatuses that support sidelink cancellation for out of coverage user equipment. In various aspects discussed herein, described techniques provide for signaling of cancellation indications to a user equipment (UE) or a group of UEs to refrain from performing sidelink communications on a set of resources. For example, a base station may transmit a cancellation indication to one or more sidelink UEs indicating that an allocation of one or more resources for sidelink communications has been canceled. A first UE may receive the cancellation indication from the base station via an access link with the base station, and transmit a sidelink communication to one or more other UEs that indicates the canceled resource allocation. Based on the sidelink communication of the cancellation indication from the first UE, the one or more other UEs may refrain from transmitting using the canceled resources.

In some cases, the one or more other UEs that receive the cancellation indication from the first UE may be out of coverage for access link communications with the base station (e.g., such a UE may be outside of a coverage area of the base station, may not have an established connection with the base station for receiving access link communications, or any combinations thereof). In some cases, a second UE may detect that a third UE transmitted a sidelink communication using the canceled resources, and may transmit a message to the first UE (e.g., a synchronization reference (syncRef) UE) that indicates the third UE transmitted using canceled resources. The first UE may, in some cases, retransmit the cancellation indication to the third UE using different transmission parameters (e.g., using a higher transmit power). In some cases, the sidelink communication that indicates the canceled resources may be a broadcast transmission (e.g., a physical sidelink broadcast channel (PSBCH) transmission) that is transmitted by one of the sidelink UEs (e.g., a syncRef UE). In some cases, the cancellation indication may include an identification of canceled sidelink resources, a duration of the canceled resources, a distance from the base station associated with the cancellation, a type of communication associated with the canceled resources, a start and end time of the cancellation, a sidelink UE behavior associated with the canceled resources, or any combinations thereof.

A method for wireless communications at a first user equipment (UE) is described. The method may include receiving, from a base station, an indication of a canceled resource allocation that identifies at least a portion of a sidelink resource allocation for communications between the first UE and one or more other UEs is canceled, where the one or more other UEs include at least a second UE that is out of coverage for communications with the base station and transmitting, to at least the second UE, a sidelink communication that includes a notification of the canceled resource allocation.

An apparatus for wireless communications at a first UE is described. The apparatus may include a processor, memory coupled with the processor, and instructions stored in the memory. The instructions may be executable by the processor to cause the apparatus to receive, from a base station, an indication of a canceled resource allocation that identifies at least a portion of a sidelink resource allocation for communications between the first UE and one or more other UEs is canceled, where the one or more other UEs include at least a second UE that is out of coverage for communications with the base station and transmit, to at least the second UE, a sidelink communication that includes a notification of the canceled resource allocation.

Another apparatus for wireless communications at a first UE is described. The apparatus may include means for receiving, from a base station, an indication of a canceled resource allocation that identifies at least a portion of a sidelink resource allocation for communications between the first UE and one or more other UEs is canceled, where the one or more other UEs include at least a second UE that is out of coverage for communications with the base station and means for transmitting, to at least the second UE, a sidelink communication that includes a notification of the canceled resource allocation.

A non-transitory computer-readable medium storing code for wireless communications at a first UE is described. The code may include instructions executable by a processor to receive, from a base station, an indication of a canceled resource allocation that identifies at least a portion of a sidelink resource allocation for communications between the first UE and one or more other UEs is canceled, where the one or more other UEs include at least a second UE that is out of coverage for communications with the base station and transmit, to at least the second UE, a sidelink communication that includes a notification of the canceled resource allocation.

In some examples of the method, apparatuses, and non-transitory computer-readable medium described herein, the transmitting the sidelink communication may include operations, features, means, or instructions for transmitting a sidelink broadcast communication to the one or more other UEs that indicates the canceled resource allocation. In some examples of the method, apparatuses, and non-transitory computer-readable medium described herein, the sidelink communication includes one or more of a distance from the base station that is associated with the canceled resource allocation, or an identification of the base station that provided the indication of the canceled resource allocation, for determination at the second UE of whether to cancel sidelink transmissions that use the canceled resource allocation.

In some examples of the method, apparatuses, and non-transitory computer-readable medium described herein, the transmitting the sidelink communication may include operations, features, means, or instructions for transmitting a physical sidelink broadcast channel (PSBCH) transmission that includes the notification of the canceled resource allocation and a PSBCH payload. In some examples of the method, apparatuses, and non-transitory computer-readable medium described herein, the transmitting the sidelink communication may include operations, features, means, or instructions for transmitting a PSBCH transmission that includes a codepoint that identifies resources for a separate sidelink communication to be transmitted to the second UE and transmitting the notification of the canceled resource allocation in the separate sidelink communication.

In some examples of the method, apparatuses, and non-transitory computer-readable medium described herein, the receiving the indication of the canceled resource allocation may include operations, features, means, or instructions for receiving downlink control information (DCI) from the base station that provides the indication of the canceled resource allocation. Some examples of the method, apparatuses, and non-transitory computer-readable medium described herein, a format of the DCI provides that the indication of the canceled resource allocation is decoded by a set of multiple UEs that are within coverage for communications with the base station, is decoded by only the first UE, or is to remain in place until removed by the base station.

In some examples of the method, apparatuses, and non-transitory computer-readable medium described herein, the receiving the indication of the canceled resource allocation may include operations, features, means, or instructions for receiving a system information block from the base station that provides a modification to a sidelink resource pool configuration. In some examples of the method, apparatuses, and non-transitory computer-readable medium described herein, the receiving the indication of the canceled resource allocation may include operations, features, means, or instructions for receiving, from the base station, a medium access control (MAC) control element, radio resource control (RRC) signaling, or combinations thereof, that provides the indication of the canceled resource allocation. In some examples of the method, apparatuses, and non-transitory computer-readable medium described herein, the MAC control element, the RRC signaling, or combinations thereof, may be transmitted only when the indication of the canceled resource allocation is present or may be transmitted periodically irrespective of whether the indication of the canceled resource allocation is present.

In some examples of the method, apparatuses, and non-transitory computer-readable medium described herein, the indication of the canceled resource allocation provides one or more of an identification of sidelink resources that are canceled, a duration of the canceled resource allocation, a distance from the base station that is associated with the canceled resource allocation, a type of communications associated with the canceled resource allocation, a start and end time for the canceled resource allocation, a sidelink UE behavior associated with the canceled resource allocation, and or any combinations thereof. In some examples of the method, apparatuses, and non-transitory computer-readable medium described herein, the notification of the canceled resource allocation may be configured to be retransmitted by the second UE to at least a third UE that is out of coverage for communications with the base station.

In some examples of the method, apparatuses, and non-transitory computer-readable medium described herein, the notification of the canceled resource allocation may be transmitted to the second UE based on the second UE being a synchronization reference UE for sidelink communications, and where the notification of the canceled resource allocation is configured to be retransmitted in a PSBCH transmission from the second UE to at least the third UE. Some examples of the method, apparatuses, and non-transitory computer-readable medium described herein may further include operations, features, means, or instructions for receiving a sidelink transmission from a third UE on sidelink resources associated with the canceled resource allocation and transmitting a message to the third UE, or to a synchronization reference UE for sidelink communications, that indicates the third UE transmitted using the sidelink resources associated with the canceled resource allocation.

In some examples of the method, apparatuses, and non-transitory computer-readable medium described herein, the first UE may be a synchronization reference UE and the method, apparatuses, and non-transitory computer-readable medium may include further operations, features, means, or instructions for receiving a message that indicates a third UE of the set of multiple sidelink UEs transmitted using the sidelink resources associated with the canceled resource allocation and retransmitting the sidelink communication that includes the notification of the canceled resource allocation to at least the third UE, where the retransmitting is at a higher power than an initial power used for the sidelink communication.

A method for wireless communications is described. The method may include receiving a sidelink communication from a first UE at a second UE, the sidelink communication including a notification of a canceled resource allocation from a base station that cancels one or more resources for sidelink communications between a set of multiple sidelink UEs, where the set of multiple sidelink UEs include the first UE and the second UE, and the second UE is out of coverage for communications with the base station and canceling, based on the notification, one or more sidelink communications with one or more of the set of multiple sidelink UEs.

An apparatus for wireless communications is described. The apparatus may include a processor, memory coupled with the processor, and instructions stored in the memory. The instructions may be executable by the processor to cause the apparatus to receive a sidelink communication from a first UE at a second UE, the sidelink communication including a notification of a canceled resource allocation from a base station that cancels one or more resources for sidelink communications between a set of multiple sidelink UEs, where the set of multiple sidelink UEs include the first UE and the second UE, and the second UE is out of coverage for communications with the base station and canceling, base at least in part on the notification, one or more sidelink communications with one or more of the set of multiple sidelink UEs.

Another apparatus for wireless communications is described. The apparatus may include means for receiving a sidelink communication from a first UE at a second UE, the sidelink communication including a notification of a canceled resource allocation from a base station that cancels one or more resources for sidelink communications between a set of multiple sidelink UEs, where the set of multiple sidelink UEs include the first UE and the second UE, and the second UE is out of coverage for communications with the base station and means for canceling, based on the notification, one or more sidelink communications with one or more of the set of multiple sidelink UEs.

A non-transitory computer-readable medium storing code for wireless communications is described. The code may include instructions executable by a processor to receive a sidelink communication from a first UE at a second UE, the sidelink communication including a notification of a canceled resource allocation from a base station that cancels one or more resources for sidelink communications between a set of multiple sidelink UEs, where the set of multiple sidelink UEs include the first UE and the second UE, and the second UE is out of coverage for communications with the base station and canceling, base at least in part on the notification, one or more sidelink communications with one or more of the set of multiple sidelink UEs.

Some examples of the method, apparatuses, and non-transitory computer-readable medium described herein may further include operations, features, means, or instructions for transmitting, to at least a third UE of the set of multiple sidelink UEs that is out of coverage for communications with the base station, a sidelink message that indicates the canceled resource allocation. In some examples of the method, apparatuses, and non-transitory computer-readable medium described herein, the sidelink message may be transmitted by the second UE in a sidelink broadcast communication to the set of multiple sidelink UEs. In some examples of the method, apparatuses, and non-transitory computer-readable medium described herein, the sidelink message may be transmitted in a PSBCH transmission that includes the canceled resource allocation and a PSBCH payload. In some examples of the method, apparatuses, and non-transitory computer-readable medium described herein, the sidelink message may be transmitted by the second UE in a PSBCH transmission that includes a codepoint that identifies resources for a separate sidelink communication and the separate sidelink communication indicates the canceled resource allocation.

In some examples of the method, apparatuses, and non-transitory computer-readable medium described herein, the notification may be transmitted to the second UE based on the second UE being a synchronization reference UE for sidelink communications and the method, apparatuses, and non-transitory computer-readable medium may include further operations, features, means, or instructions for receiving an indication that the third UE transmitted using the sidelink resources associated with the canceled resource allocation and retransmitting, to at least the third UE, the sidelink communication that includes the notification of the canceled resource allocation, where the retransmitting may be at a higher power than an initial power used for the sidelink message that indicates the canceled resource allocation.

In some examples of the method, apparatuses, and non-transitory computer-readable medium described herein, the notification may be received from the first UE in one or more of SCI, a MAC control element, RRC signaling, or combinations thereof. In some examples of the method, apparatuses, and non-transitory computer-readable medium described herein, the notification may be transmitted to the second UE based on the second UE being a synchronization reference UE for sidelink communications, and where the notification may be configured to be retransmitted in a PSBCH transmission from the second UE to at least a third UE of the set of multiple sidelink UEs. Some examples of the method, apparatuses, and non-transitory computer-readable medium described herein may further include operations, features, means, or instructions for determining that a third UE of the set of multiple sidelink UEs transmitted using sidelink resources associated with the canceled resource allocation and transmitting a message to the third UE, or to a synchronization reference UE for sidelink communications, that indicates the third UE transmitted using the sidelink resources associated with the canceled resource allocation.

DETAILED DESCRIPTION

Figure 1:
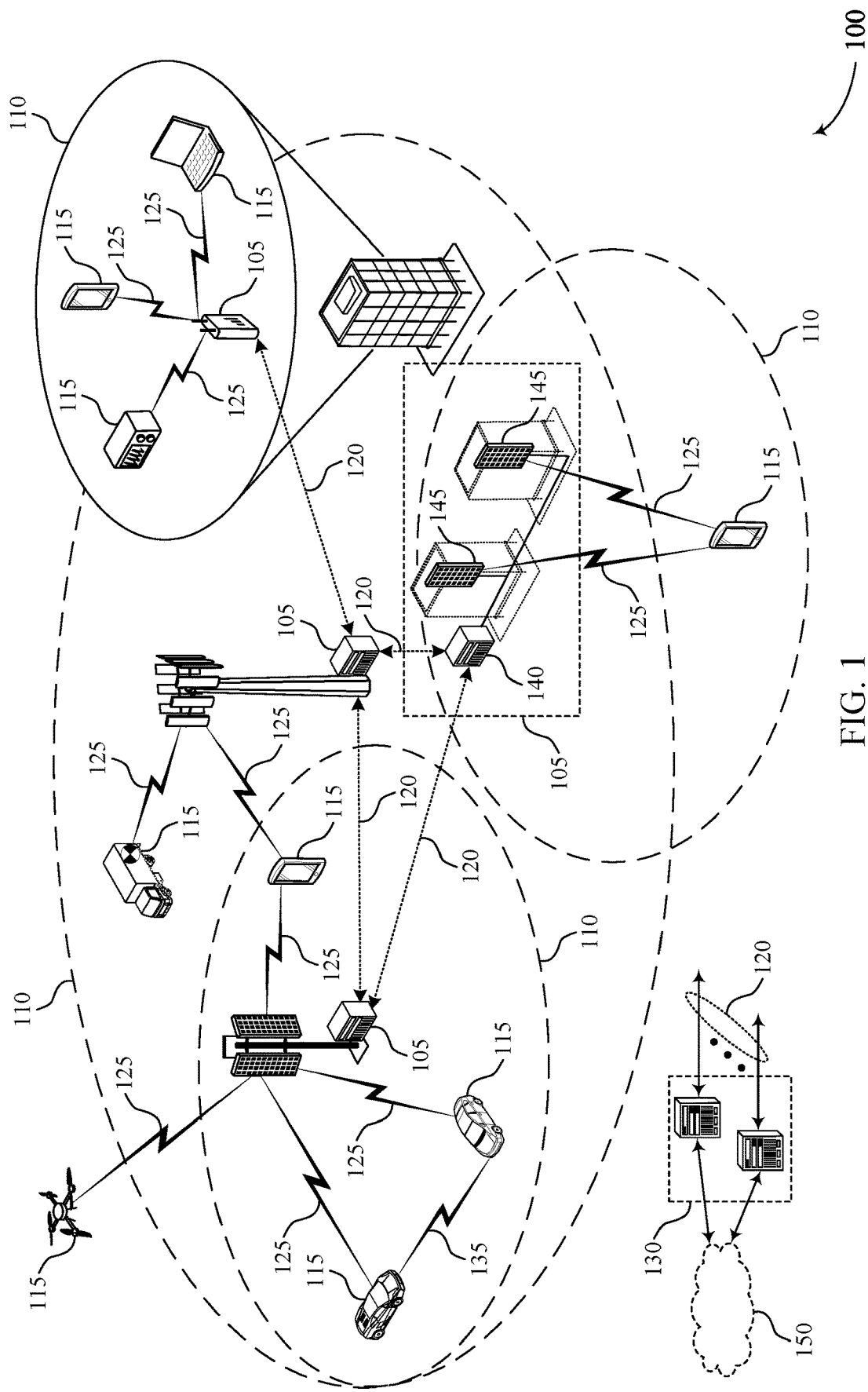
FIG. 1 illustrates an example of a wireless communications system that supports sidelink cancellation for out of coverage user equipment in accordance with aspects of the present disclosure.

Some wireless communications systems, such as fifth generation (5G) systems, which may be referred to as New Radio (NR) systems, may support both access link and sidelink communications between devices. An access link (e.g., a Uu interface) may refer to a communication link between a network node (e.g., a base station) and a user equipment (UE). A sidelink (e.g., a PC5 interface) may refer to a communication link between user, relay, or end devices (e.g., a communication link between UEs). It is noted that while various examples provided herein are discussed for UE sidelink devices, such sidelink techniques may be used for any type of wireless devices that use sidelink communications. For example, a sidelink may support device-to-device (D2D) communications, vehicle-to-everything (V2X) or vehicle-to-vehicle (V2V) communications, message relaying, discovery signaling, beacon signaling, or any combination of these or other signals transmitted over-the-air from one UE to one or more other UEs.

In some examples, access link and sidelink communications may use a same frequency band (e.g., a licensed band), and sidelink communications may occur using a same set of frequency resources as access link communications. In such cases, sidelink communications may interfere with communications on one or more access links in cases where the communications overlap in time. For example, sidelink communications between two or more UEs may cause interference with uplink or downlink communications between another UE and a base station, which may be in a coverage area associated with the access link. Additionally, or alternatively, some sidelink communications may occur outside of a coverage area associated with the access links (i.e., if a UE using an access link is near a boundary of the coverage area). Such interference may lead to unreliable communications on access links.

To mitigate or reduce interference, a wireless communications system may use signaling of a cancellation indication to instruct one or more UEs to refrain from performing sidelink communications on a set of resources. In some examples, a base station may transmit a cancellation indication to one or more sidelink UEs indicating that certain sidelink resources that were allocated for sidelink communications among the UEs are canceled and thus the UEs are to refrain from transmitting or receiving on the indicated resources. In some implementations, the base station may transmit control signaling (e.g., a downlink control information (DCI) message) that includes the cancellation indication. In some examples, the cancellation indication may include an index associated with one or more of a serving cell, a resource pool, or a UE, and a UE receiving the cancellation indication may determine a set of resources that are canceled based on the index.

In accordance with various aspects of the present disclosure, a UE that receives a cancellation indication from a base station may transmit a sidelink cancellation indication to one or more sidelink UEs in a sidelink message. For example, a base station may transmit a cancellation indication (e.g., in a DCI transmission) to one or more sidelink UEs indicating that an allocation of one or more resources for sidelink communications has been canceled. A first UE may receive the cancellation indication from the base station via an access link and transmit a sidelink message with a sidelink cancellation indication to one or more other UEs that indicates the canceled resource allocation. Based on the sidelink communication of the cancellation indication from the first UE, the one or more other UEs may refrain from transmitting using the canceled sidelink resources.

In some cases, the one or more other UEs that receive the sidelink message with the sidelink cancellation indication from the first UE may be out of coverage for access link communications with the base station. For example, such UEs may be outside of a coverage area of the base station and are thus not able to maintain an access link connection with the base station, or such UEs may be within the coverage area of the base station but may not have an established access link connection with the base station. In cases where a UE is within the coverage area of the base station, the UE may have a sidelink connection with the first UE (e.g., using mode 2 sidelink communications). As used herein, an out of coverage UE may refer to a UE that does not have an active access link connection with the base station, which may include UEs that are within a coverage area of the base station but do not have an established access link, UEs that are outside of a coverage area of the base station, or combinations thereof. In some cases, an out of coverage UE may receive the sidelink message from the first UE and refrain from sidelink transmissions using resources associated with the sidelink cancellation indication contained in the sidelink message.

In some cases, a second UE may detect that a third UE transmitted a sidelink communication using the canceled resources, and may transmit a message to the first UE or a synchronization reference (syncRef) UE that indicates the third UE transmitted using canceled resources. The first UE or syncRef UE may, in some cases, retransmit the cancellation indication to the third UE using different transmission parameters (e.g., using higher transmit power, additional repetitions, other coverage enhancement techniques, or any combinations thereof).

In some cases, the sidelink message that indicates the canceled resources may transmitted via a broadcast transmission (e.g., a physical sidelink broadcast channel (PSBCH) transmission) that is transmitted by one of the sidelink UEs (e.g., a syncRef UE). In some cases, the sidelink message may be transmitted via a physical sidelink shared channel (PSSCH) or via a physical sidelink control channel (PSCCH) using control signaling (e.g., a sidelink control information 1 (SCI1) or sidelink control information 2 (SCI2) message, a medium access control (MAC) control element (CE), etc.). In some cases, the cancellation indication may include an identification of canceled sidelink resources, a duration of the canceled resources, a distance from the base station associated with the cancellation, a type of communication associated with the canceled resources, a start and end time of the cancellation, a sidelink UE behavior associated with the canceled resources, or any combinations thereof.

In some implementations, a sidelink UE may adjust the sidelink cancellation indication based on a transmission time. For example, a first UE may receive a cancellation indication indicating that a portion of a sidelink resource allocation (e.g., a portion of a sidelink resource pool) is canceled. The first UE may determine that a first subset of the sidelink resource allocation may no longer be available for sidelink communications due to the processing time at the first UE for providing the sidelink cancellation indication, the time used for channel sensing and accessing or reserving resources of the sidelink channel (e.g., for sidelink mode 2 communications), a transmission time associated with the sidelink cancellation indication, or any combination thereof. Accordingly, the first UE may transmit an adjusted sidelink cancellation indication including a portion of the sidelink resource allocation that are canceled. Additionally, or alternatively, the first UE may transmit an indication of a time (e.g., a time, a slot index, a direct frame number, etc.) associated with the sidelink cancellation indication. After receiving the sidelink cancellation indication from the first UE, the receiving sidelink UE may determine a resources that are canceled based on the indicated time.

In some implementations, a sidelink UE that receives the sidelink message with the sidelink cancellation indication may refrain from performing sidelink communications based on a priority level associated with the sidelink communications, a priority level indicated in the sidelink cancellation indication, or combinations thereof. For example, if sidelink communications a have a priority below a priority threshold the sidelink communications may be canceled but the UE may transmit sidelink communications that have a priority above the threshold. In some implementations, the priority threshold may be configured for a UE, a sidelink resource pool, a carrier, a cast type (e.g., unicast, broadcast, multicast, etc.), a zone identification or distance from the base station, a reference signal received power, or any combination thereof.

Particular aspects of the subject matter described herein may be implemented to realize one or more of the following potential advantages. The techniques employed by the described wireless communications systems may provide benefits and enhancements to the operation of the wireless communications system. For example, the described techniques may include features improving a reliability of communications by mitigating or reducing interference between access links and sidelinks using sidelink cancellation indication signaling. The described techniques include additional features for improving resource use, power consumption, battery life, and throughput, among other benefits.

Aspects of the disclosure are initially described in the context of wireless communications systems. Aspects of the disclosure are further illustrated by and described with reference to allocated sidelink resources, process flows, apparatus diagrams, system diagrams, and flowcharts that relate to sidelink cancellation for out of coverage user equipment.

FIG. 1 illustrates an example of a wireless communications system 100 that supports sidelink cancellation for out of coverage user equipment in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125 (e.g., which may also be referred to as access links). Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, multiple UEs 115 may be configured for sidelink communications (e.g., using a sidelink or D2D communication link 135) using a sidelink resource allocation (e.g., an allocated sidelink resource pool). A base station 105 may determine that part or all of a sidelink resource allocation for a certain period of time is to be canceled, such as due to high priority communications that preempt the sidelink communications, and may transmit a cancellation indication (e.g., via an access link or communication link 125) to one or more of the sidelink UEs 115 to refrain from performing sidelink communications on the canceled resources. A first UE 115 may receive the cancellation indication from the base station 105 via the access link with the base station 105, and transmit a sidelink communication to one or more other UEs 115 that may be out of coverage for communications with the base station 105, that indicates the canceled resource allocation. Based on the sidelink communication of the cancellation indication from the first UE 115, the one or more other UEs 115 may refrain from transmitting using the canceled resources.

Figure 2:
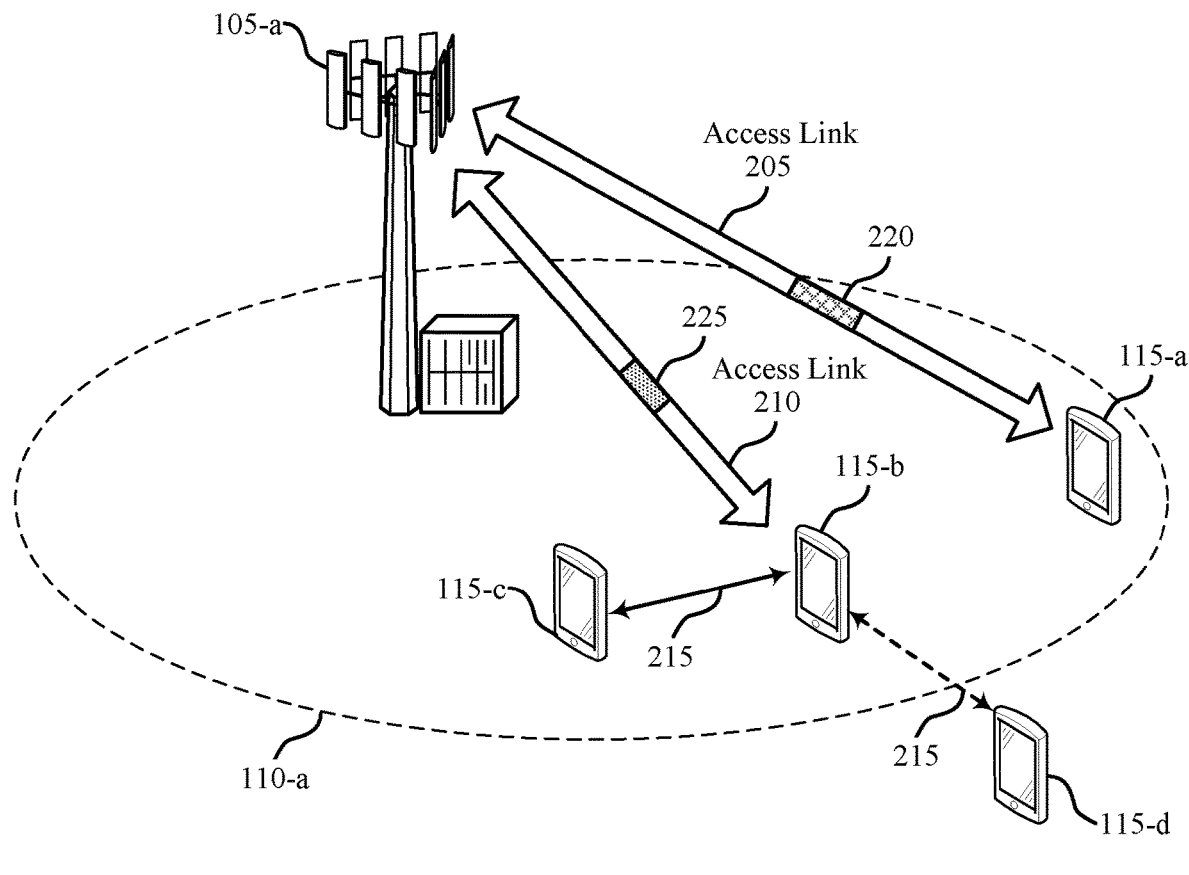
FIG. 2 illustrates an example of a portion of a wireless communications system that supports sidelink cancellation for out of coverage user equipment in accordance with aspects of the present disclosure.

FIG. 2 illustrates an example of a wireless communications system 200 that supports sidelink cancellation for out of coverage user equipment in accordance with aspects of the present disclosure. In some examples, the wireless communications system 200 may implement one or more aspects of a wireless communications system 100 as described with reference to FIG. 1. The wireless communications system 200 may include a first UE 115-*a*, a second UE 115-*b*, a third UE 115-*c*, and a fourth UE 115-*d* which may be examples of a UE 115 as described with reference to FIG. 1. The wireless communications system 200 may also include a base station 105-*a* which may be an example of a base station 105 as described with reference to FIG. 1. The base station 105-*a* may be associated with a cell that provides wireless communications service within a coverage area 110-*a*.

In some examples, the base station 105-*a* may communicate with the first UE 115-*a* via a first access link 205 (e.g., a Uu interface), and may communicate with the second UE 115-*b* via a second access link 210 (e.g., a Uu interface). In the example of FIG. 2, the second UE 115-*b*, the third UE 115-*c*, and the fourth UE 115-*d* may communicate via sidelinks 210 which may be examples of a PC5 interface. It is noted that, in some examples, UEs 115 operating using sidelink communications via sidelinks 210 may be in or out of coverage for communications with the base station 105-*a*. For example, the third UE 115-*c* may not have an established access link connection with the base station 105-*a*, but may have established sidelink 210 with one or more other UEs 115 (e.g., according to sidelink mode 2 operation). Thus, even though the third UE 115-*c* is within the coverage area 110-*a* of the base station 105-*a*, it may be considered to be out of coverage for communications with the base station 105-*a*. Further, in this example, the fourth UE 115-*d* is outside of the coverage area 110-*a* of the base station 105-*a*, and is out of coverage for communications with the base station 105-*a* based on an inability to establish reliable communications due to proximity with the base station 105-*a*. In some other examples, UEs 115 may operate using Mode 1 sidelink resource allocation in which the base station 105-*a* assigns transmission resources for sidelink communications (e.g., through DCI format 3_0) and in such examples only the fourth UE 115-*d* may be out of coverage for communications with the base station 105-*a*.

In some cases, sidelink communications via one or more of the second UE 115-*b*, the third UE 115-*c*, or the fourth UE 115-*d* may interfere with first access link 205 communications 220 between the first UE 115-*a* and the base station 105-*a*. For example, the communications 220 may be high-priority low-latency communications that the base station 105-*a* may determine to transmit using resources that were previously allocated for sidelink communications. To help mitigate or reduce interference, the wireless communications system 200 may implement sidelink cancellation indication techniques to manage resources shared by access link and sidelink communications. In some cases, the base station 105-*a* may transmit a cancellation indication 225 to the second UE 115-*b* via second access link 210. The second UE 115-*b* may receive the cancellation indication 225 and determine that it identifies resources that are allocated for sidelink communications. For example, the base station 105-*a* may determine that a set of time-frequency resources for first access link 205 communications 220 overlap time-frequency resources for sidelink communications between the second UE 115-*b*, the third UE 115-*c*, and the fourth UE 115-*d*. The base station 105-*a* may transmit cancellation indication 225 to the second UE 115-*b* via the second access link 210 (e.g., and to the third UE 115-*c* in cases where an access link with the third UE 115-*c* is established), that indicates the overlapping set of time-frequency resources.

In some examples, the cancellation indication 225 may be provided as an uplink cancellation indication in DCI. For example, DCI format 2_4 may be used for multiple in-coverage UEs or DCI format 3_0 may be used for a specific in-coverage UE, with a payload that indicates resources being preempted, which the second UE 115-*b* may identify as sidelink resources. In some cases, the cancellation indication 225 may be provided in a sidelink-specific cancellation DCI that may be defined for longer term sidelink cancellation (e.g., cancellation may be in place until it is suspended; or can be seen as a modification of the sidelink resource pool). In some examples, the cancellation indication 225 may be provided in a system information block (SIB) to in-coverage UEs (e.g., in a SIB12 block transmitted to the second UE 115-*b* that indicates canceled sidelink resources). In some cases, the SIB may modify or update one or more sidelink resource pool configurations. In further examples, the cancellation indication 225 may be provided in a MAC-CE or in RRC signaling. In some cases, the MAC-CE, RRC signaling, or both, may be configured such that the MAC-CE and/or RRC are "always on" and periodically transmitted to in-coverage UEs 115 supporting sidelink, or selected UEs (e.g., second UE 115-*b*) that broadcast PSBCH (e.g., a syncRef UE), irrespective of whether sidelink resources are canceled for an associated time period. In other cases, the MAC-CE and/or RRC may be "on demand," and only transmitted if the base station 105-*a* intends to modify sidelink resources. The cancellation indication 225 may include various items of information related to the cancellation, which are discussed for several examples with reference to FIGS. 3 and 4.

Figure 3:
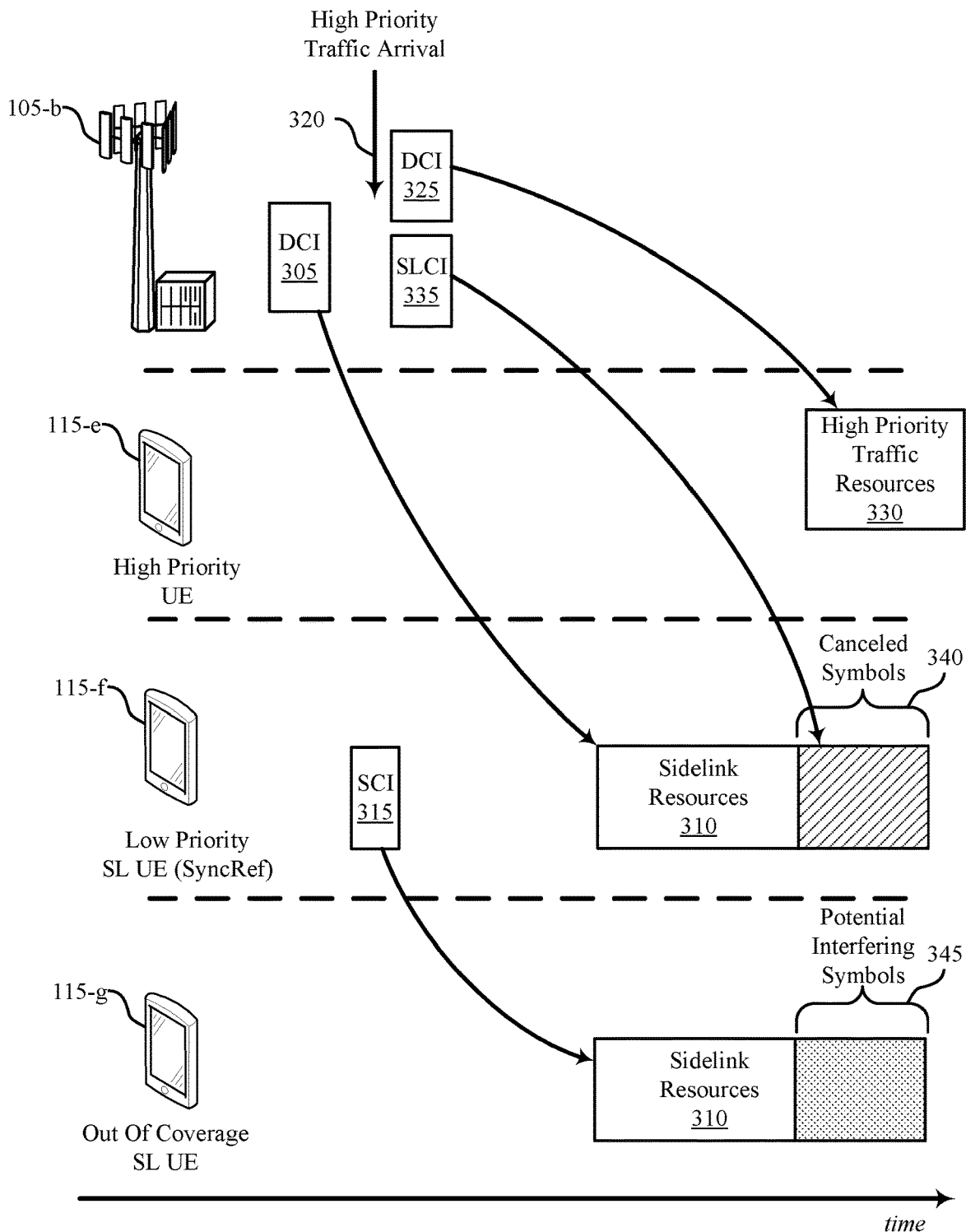
FIGS. 3 and 4 illustrate examples of cancellation indications and associated resources that support sidelink cancellation for out of coverage user equipment in accordance with aspects of the present disclosure.

FIG. 3 illustrates an example of a cancellation indication and associated resources 300 that supports sidelink cancellation for out of coverage user equipment in accordance with aspects of the present disclosure. In some examples, the cancellation indication and associated resources 300 may implement aspects of a wireless communications systems 100 or 200. In this example, communications are illustrated for a base station 105-*b*, a high priority UE 115-*e*, a low priority sidelink UE 115-*f*, and an out of coverage sidelink UE 115-*g*, which may be examples of the corresponding devices as described herein. While separate UEs 115 are illustrated in this example as being the high priority UE 115-*e* and the low priority sidelink UE 115-*f*, techniques discussed herein are applicable generally to low priority traffic and high priority traffic. Thus, in some examples, a same UE 115 may transmit both high priority traffic and low priority traffic in accordance with techniques discussed herein.

In some examples, the base station 105-*b* may transmit control information in DCI 305 that indicates or activates a sidelink resource pool 310 for use in sidelink communications between the low priority sidelink UE 115-*f* and one or more other UEs such as the out of coverage sidelink UE 115-*g*. In some cases, the sidelink resource pool 310 may be configured in configuration information (e.g., in RRC configuration information, in one or more SIBs, in one or more MAC-CEs, or any combinations thereof), and the DCI 305 may activate all or a portion of the configured sidelink resources. In the example of FIG. 3, the low priority sidelink UE 115-*f* may transmit sidelink control information (SCI) 315 to the out of coverage sidelink UE 115-*g* (and in some cases one or more other sidelink UEs) that indicates the available sidelink resources of the sidelink resource pool 310. The base station 105-*b* may identify a high priority traffic arrival 320 for high priority traffic associated with the high priority UE 115-*e*. In some cases, the base station 105-*b* may determine a set of high priority traffic resources 330 for the high priority traffic, and the high priority traffic resources 330 may overlap in time and frequency with all or a portion of the sidelink resource pool 310.

As discussed herein, sidelink transmissions that overlap with the high priority traffic resources 330 may be canceled in accordance with various described techniques in order to avoid interference between the high priority communications and the sidelink communications. In the example of FIG. 3, the base station 105-*b* may transmit a resource allocation for the high priority traffic resources 330 to the high priority UE 115-*e* in DCI 325, and the base station 105-*b* may transmit a sidelink cancellation indication (SLCI) 335 to the low priority sidelink UE 115-*f*. In some cases, the SLCI 335 may be transmitted in a DCI (e.g., using DCI format 2_4 or 3_0) on a physical downlink control channel (PDCCH) of the access link between the base station 105-*b* and the low priority sidelink UE 115-*f*. The SLCI 335 may indicate the high priority traffic resources 330, may indicate one or more canceled symbols 340 of the sidelink resource pool 310, or both. The low priority sidelink UE 115-*f* may then refrain from sidelink communications using the canceled symbols 340. However, in an absence of any additional signaling, the out of coverage sidelink UE 115-*g* may not receive a notice of the canceled symbols 340 (e.g., due to not receiving and decoding the SLCI 335), and may thus attempt a transmission, and thus potentially interfering symbols 345 may be present in the sidelink resource pool 310. In accordance with various techniques provided herein, the low priority sidelink UE 115-*f* (e.g., which may be a syncRef UE) may transmit a message via sidelink communications to one or more sidelink UEs, including the out of coverage sidelink UE 115-*g*, that indicates the canceled sidelink resources. An example of such a sidelink message is discussed with reference to FIG. 4.

Figure 4:
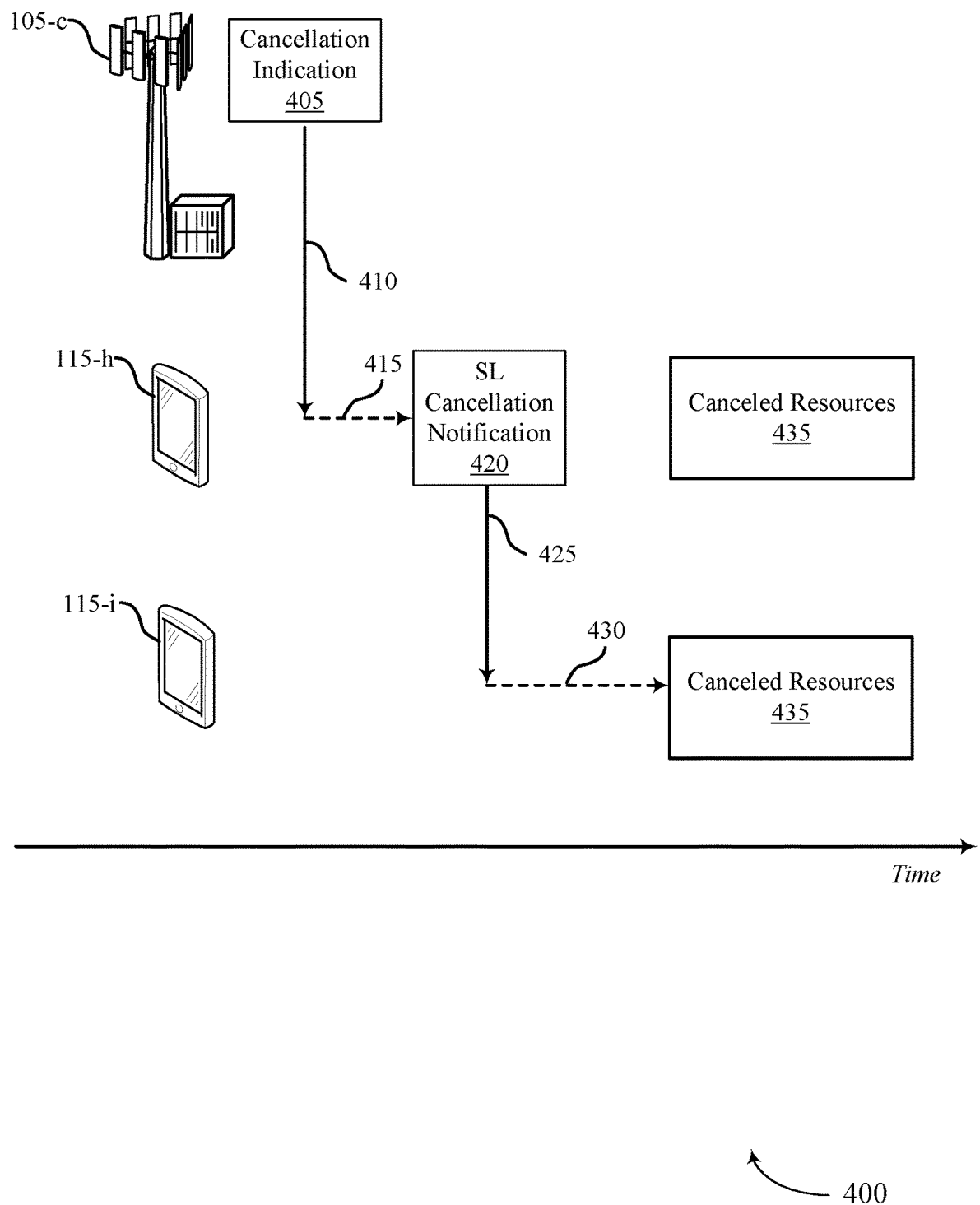

FIG. 4 illustrates an example of a cancellation indication and associated resources 400 that supports sidelink cancellation for out of coverage user equipment in accordance with aspects of the present disclosure. In some examples, the cancellation indication and associated resources 400 may implement aspects of a wireless communications systems 100 or 200. In this example, communications are illustrated for a base station 105-*c*, a first UE 115-*h*, and a second UE 115-*i*, which may be examples of the corresponding devices as described herein.

In some examples, the base station 105-*c* may transmit cancellation indication 405 (e.g., in a DCI communication via an access link) to the first UE 115-*h*. In some cases, the first UE 115-*h* may be in-coverage for communications with the base station 105-*c* (e.g., within a coverage area of the base station 105-*c* and with an active access link with the base station 105-*c*). Based on the cancellation indication 405, the first UE 115-*h* may determine that sidelink communications are scheduled via resources that at least partially overlap the canceled resources and may determine to transmit a sidelink cancellation notification 420 to other sidelink UEs 115. The first UE 115-*h* may transmit the sidelink cancellation notification 420 to the second UE 115-*i*, and in some cases to one or more other sidelink UEs that may be in-coverage or out of coverage for communications with the base station 105-*c*. In some cases, the cancellation indication 405 from the base station 105-*c* may be received at time 410, and the sidelink cancellation notification 420 may be transmitted some time period 415 after the sidelink cancellation notification 420. The sidelink cancellation notification 420 may include an indication of canceled resource 435 of a configured sidelink resource pool, for example. In some cases, the first UE 115-*h* may transmit the sidelink cancellation notification 420 at time 425, and the second UE 115-*i* may cancel resources based on the notification after a time 430 associated with the sidelink cancellation notification 420.

In some cases, the cancellation indication 405 may provide a SLCI to the first UE 115-*h*. In some cases, the SLCI may include an indication of canceled resources, an indication of higher priority resources, or any combinations thereof. In some cases, the SLCI may include a codepoint for sidelink time and frequency resources indication that will be suspended for sidelink use. In some cases, the SLCI may include a bitmap of resources that may indicate a portion of the associated resources that are canceled (e.g., similar to uplink cancellation indications provided in DCI format 2_4 or 2_1), where bits within the bitmap may represent a group of resources in current sidelink resource pool configuration. In some cases, additionally or alternatively, the SLCI may include a codepoint for a duration of the cancellation (e.g., that indicates a number of slots or symbols as a duration of the cancellation. In some cases, the SLCI may indicate a periodic cancellation with a configured periodicity. In other cases, the SLCI may indicate a range of the cancellation (e.g., a distance to a cell edge at which transmissions are to be canceled). In some cases, the SLCI may indicate a RF power constraint for cancellation of transmissions where a measured RF power above a threshold value may indicate sidelink transmissions are to be canceled and RF power below the threshold (e.g., a RF power of −78 dBm measured at cell edge) may indicate sidelink transmissions may not be canceled. In some cases, the SLCI may include a codepoint for type of the cancellation (e.g., a one-shot cancellation for a configured duration, a periodic cancellation, or a permanent cancellation until further signaling). Additionally or alternatively, the SLCI may include a codepoint for a starting/ending time of the cancellation, a codepoint for behavior of the cancellation (e.g., all UEs are to cancel transmissions that use the canceled resource, or only certain UEs can use the canceled resource such as low transmit power UEs or high priority traffic UEs).

Additionally or alternatively, the SLCI may be associated with a priority, a channel condition (e.g., a reference signal received power (RSRP)), zone identification (e.g., UE distance from or location relative to the base station 105-*a*), a periodicity of cancellation, a resource pool identification, a cast type (e.g., broadcast, unicast, multicast, etc.), or any combinations thereof for the canceled sidelink resources. In some examples, the SLCI may be specific to a resource pool or to a set of resource pools, to a serving cell or to a set of serving cells, or combinations thereof.

In some cases, the sidelink cancellation notification 420 may be transmitted by the first UE 115-*h* to other UEs, such as the second UE 115-*i*. In some cases, the sidelink cancellation notification 420 may be transmitted in a PSBCH communication to multiple other sidelink UEs, and out of coverage UEs that decode the PSBCH can avoid using the canceled resources. In some cases, the base station 105-*c* may select the first UE 115-*h* for broadcasting the SLCI in PSBCH based on one or more parameters of the first UE 115-*h* (e.g., a location or signal strength associated with the first UE 115-*h*). In some cases, the PSBCH may include an indication of the base station 105-*c* identity (e.g., a cell ID associated with the base station 105-*c*), and out of coverage UEs such as the second UE 115-*i* may comply with the indicated cancellation if it is provided with valid base station ID (e.g., that is associated with the base station 105-*c* that configured the sidelink resource pool). Further, out of coverage UEs such as second UE 115-*i* may comply with the indicated cancellation when within an indicated range in SLCI (e.g., a distance from the cell edge). Additionally, in some cases, an out of coverage UE may relay a SLCI decoded from a syncRef UE that broadcasts PSBCH if the out of coverage UE is within a range indicated in SLCI.

In some cases, the first UE 115-*h* may transmit a PSBCH payload that directly includes the SLCI received from the base station 105-*c*. The PSBCH payload may also include, in some cases, the base station 105-*c* identity, which may be used for verification purposes. The PSBCH transmitted by the first UE 115-*h* may also include remaining PSBCH payload that may be transmitted following the SLCI (and optional base station identification). Such transmissions of SLCI in the PSBCH may thus increase the payload size of PSBCH. In other cases, the first UE 115-*h* may transmit PSBCH that indirectly indicates the SLCI or one or more parameters associated therewith. In some cases, the PSBCH may include a codepoint that indicates resources for a dedicated SLCI transmission (e.g., PSBCH points to reserved sidelink transmission resources where SLCI information is included).

In some cases, the first UE 115-*h* may transmit the SLCI in a SCI communication to one or more other UEs, including the second UE 115-*i*, which in turn may decode the SLCI and may broadcast SLCI in SCI, in a MAC-CE, in RRC, or any combinations thereof, to one or more other out of coverage UEs. In some examples, the second UE 115-*i* may initiate a dedicated transmission to its syncRef UE if its syncRef UE is out of coverage, and the out of coverage syncRef UE may include the SLCI in its PSBCH for informing other out of coverage UEs of the cancellation. In some cases, the syncRef UE may only broadcast SLCI via SCI if it is within the range indicated in the SLCI.

Additionally, in some cases, one or more sidelink UEs 115 may monitor canceled resources and provide an indication in the event that another sidelink UE 115 is using the canceled resources. For example, second UE 115-*i* may be out of coverage and may monitor canceled sidelink resources and, in the event that a sidelink transmission of a third UE is detected using the canceled resources, the second UE 115-*i* may transmit a message to the first UE 115-*h* (e.g., the syncRef UE), that indicates the third UE transmitted using the canceled resources. In some cases, the second UE 115-*i* may, additionally or alternatively, transmit an indication directly to the third UE (e.g., if an ID of the third UE is decoded). In some cases, the first UE 115-*h* may increase a transmit power for PSBCH, or more frequently broadcast the SLCI via SCI or via dedicated transmissions (e.g., using increased repetitions or other coverage enhancement techniques), to the third UE. In some examples, the first UE 115-*h* may broadcast a sidelink resource reservation for all the canceled resources indicated in SLCI (e.g., and preclude the third UE from using such resources), the first UE 115-*h* may pre-empt a resource reservation made by the third UE and cause the third UE to change its resource reservation, or combinations thereof. In some cases, the indication from the second UE 115-*i* of the transmission by the third UE may indicate one or more of a UE identification of the third UE, an interference level associated with the third UE transmission, a percentage of the time/frequency resource used by the third UE, or any combinations thereof.

Figure 5:
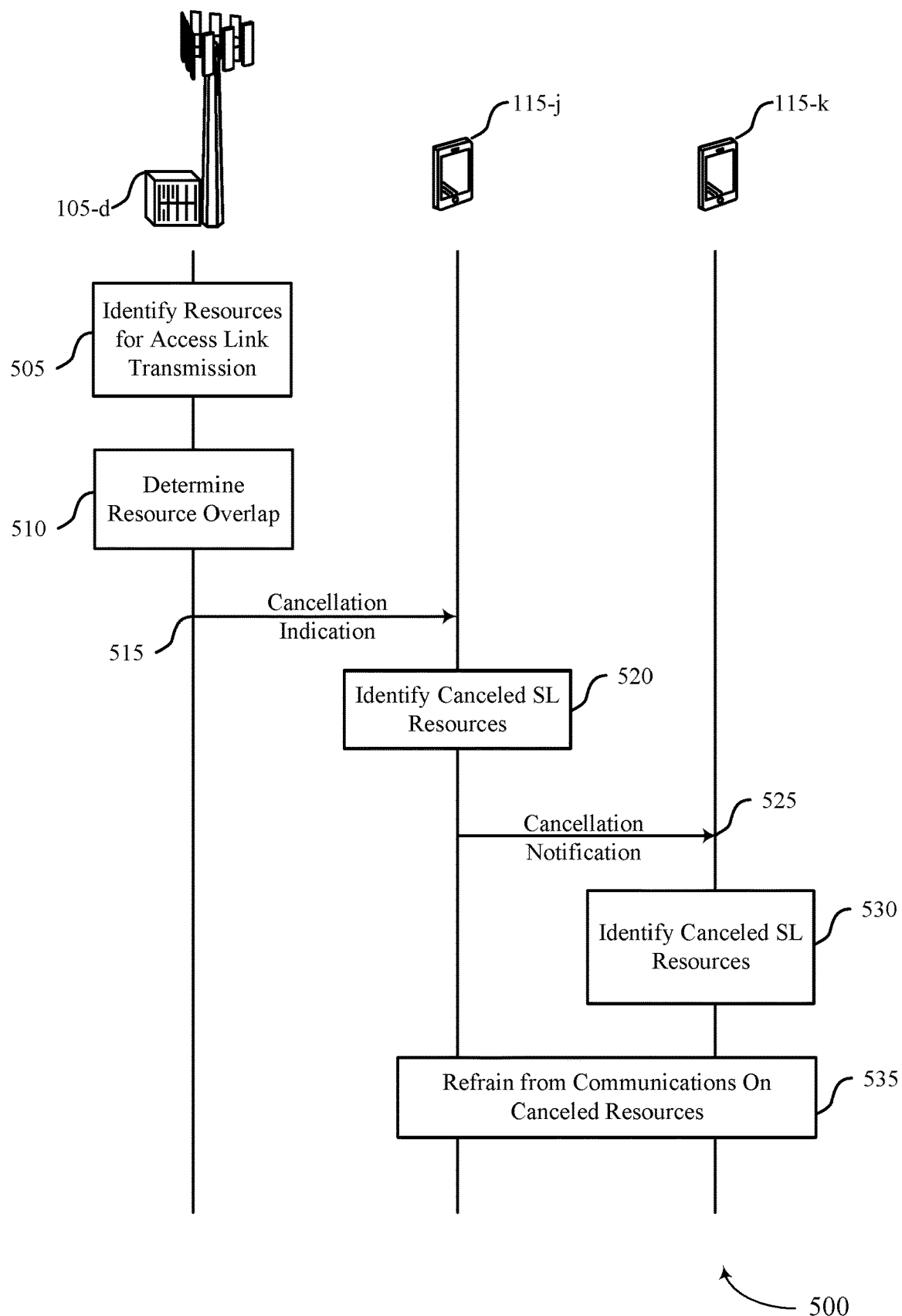
FIGS. 5 and 6 illustrate examples of process flows that support sidelink cancellation for out of coverage user equipment in accordance with aspects of the present disclosure.

FIG. 5 illustrates an example of a process flow 500 that supports sidelink cancellation for out of coverage user equipment in accordance with aspects of the present disclosure. In some examples, the process flow 500 may implement aspects of a wireless communications systems 100 or 200, may implement aspects described in examples of cancellation indications and associated resources 300 or 400, or any combination thereof as described with reference to FIGS. 1-4. The process flow 500 may include a first UE 115-*j*, a second UE 115-*k*, and a base station 105-*d* which may be examples of the corresponding devices described herein. Alternative examples of the following may be implemented where some processes are performed in a different order than described or not performed at all. In some implementations, processes may include additional features not mentioned below, or further processes may be added.

At 505, the base station 105-*d* may identify resources for transmission over an access link. For example, the base station 105-*d* may determine to transmit or receive a message over a set of resources over an access link with a UE 115. In some cases, the base station 105-*d* may make such an identification based on an arrival of high-priority low-latency traffic (e.g., ultra-reliable low-latency communication (URLLC) traffic.

At 510, the base station 105-*d* may determine an overlap between the resources scheduled for the access link and resources scheduled for sidelink communication. For example, the base station 105-*d* may have previously configured a sidelink resource pool that is available for sidelink communications between devices, such as between the first UE 115-*j* and the second UE 115-*k*. In some cases, the sidelink resource pool may be configured for communications that may have a lower priority than the access link traffic, and thus the access link traffic may preempt lower priority sidelink traffic.

At 515, the base station 105-*d* may transmit a cancellation indication to the first UE 115-*j* indicating the overlapping resources. In some examples, the base station 105-*d* may transmit the cancellation indication in a DCI message formatted for uplink cancellation (e.g., DCI format 2_4). In some examples, the base station 105-*d* may transmit the cancellation indication in a DCI message formatted for sidelink cancellation/preemption.

At 520, the first UE 115-*j* may identify canceled sidelink resources based on the overlapping resources indicated in the cancellation indication received from the base station 105-*d*. For example, the first UE 115-*j* may determine that sidelink communications are scheduled on a set of resources that overlap with resources scheduled for access link communications based on the cancellation indication. In cases where the first UE 115-*j* had scheduled sidelink communications for the canceled sidelink resources (e.g., based on a reservation of resources or prior sidelink scheduling), the first UE 115-*j* may refrain from performing sidelink communication on the canceled resources.

At 525, the first UE 115-*j* may transmit a cancellation notification via a sidelink message to at least the second UE 115-*k*. The first UE 115-*j* may transmit the cancellation notification in accordance with techniques as discussed herein, such as by transmitting a PSBCH transmission that indicates the cancellation and may indicate one or more associated parameters (e.g., indication of resources, timing for the cancellation, priority associated with the cancellation, range/distance from the base station 105-*d* associated with the cancellation, base station 105-*d* identification, etc.).

At 530, the second UE 115-*k* may receive the cancellation notification in the sidelink communications from the first UE 115-*j*, and may identify the canceled sidelink resources. In some cases, the second UE 115-*k* may identify the canceled resources based on overlapping resources indicated in the cancellation notification received from the first UE 115-*j*. For example, the second UE 115-*k* may determine that sidelink communications are scheduled on a set of resources that overlap with resources scheduled for access link communications based on the cancellation notification.

At 535, the first UE 115-*j* and the second UE 115-*k*, and any other sidelink UEs that received the cancellation notification, may refrain from communications on the canceled sidelink resources. For example, if the first UE 115-*j* or the second UE 115-*k* is operating as a transmitting device, the UE 115 may refrain from transmitting on the overlapping resources. If the first UE 115-*j* or the second UE 115-*k* is operating as a receiving device, the UE 115 may refrain from monitoring for a PSCCH or PSSCH transmission on the canceled resources or may refrain from decoding the canceled resources. Implementing various aspects of the process flow 500 may allow for decreased interference between access links and sidelinks in wireless communications systems, and allow for propagation of a cancellation indication from the base station 105-*d* to one or more UEs 115 that may be out of coverage for communications with the base station 105-*d*.

Figure 6:
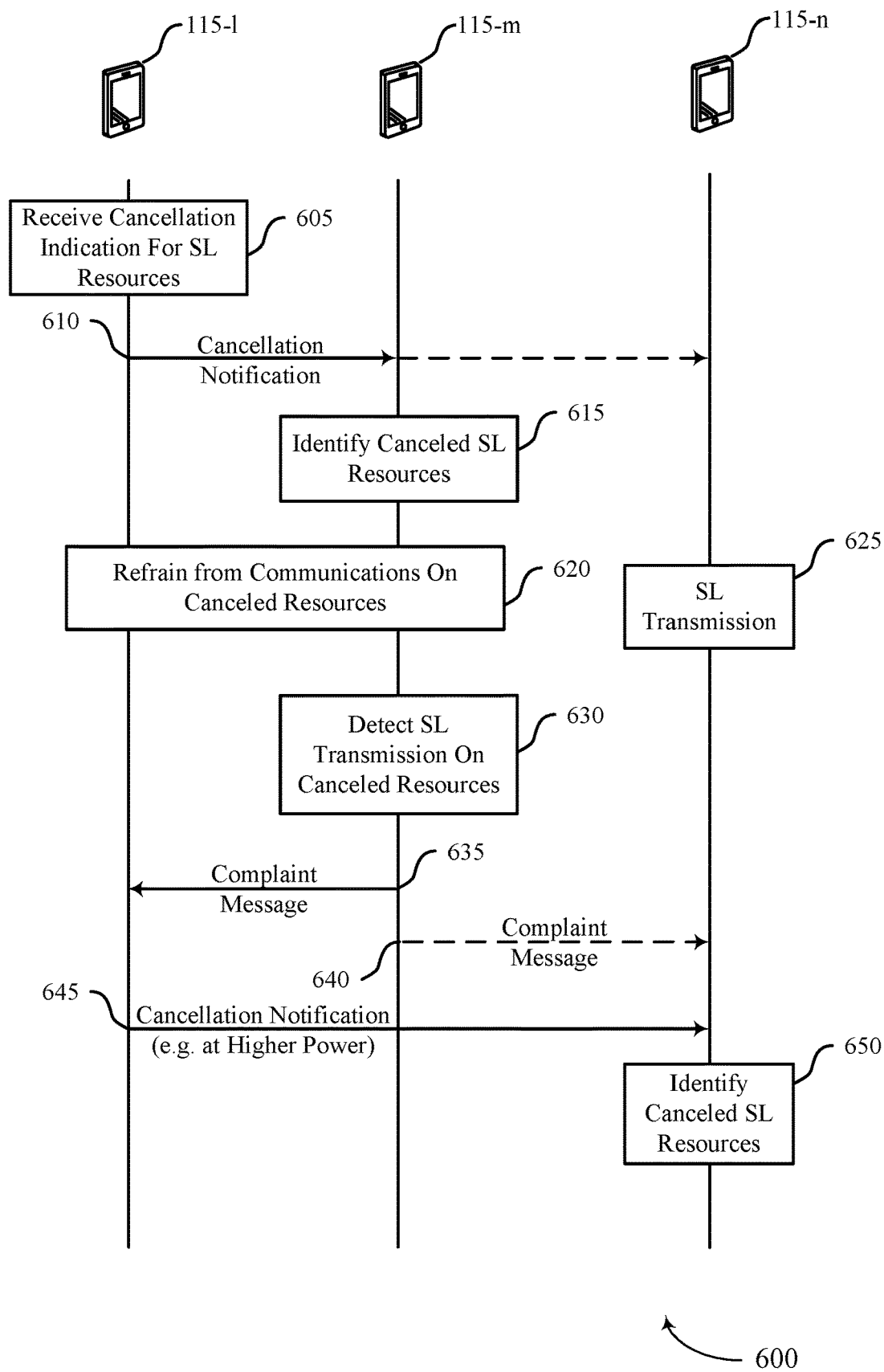

FIG. 6 illustrates an example of a process flow 600 that supports sidelink cancellation for out of coverage user equipment in accordance with aspects of the present disclosure. In some examples, the process flow 600 may implement aspects of a wireless communications systems 100 or 200, may implement aspects described in examples of cancellation indications and associated resources 300 or 400, or any combination thereof as described with reference to FIGS. 1-4. The process flow 600 may include a first UE 115-*l*, a second UE 115-*m*, and a third UE 115-*n* which may be examples of the corresponding devices described herein. Alternative examples of the following may be implemented where some processes are performed in a different order than described or not performed at all. In some implementations, processes may include additional features not mentioned below, or further processes may be added.

At 605, the first UE 115-*l* may receive a cancellation indication for sidelink resources. In some cases, the cancellation indication may be received from a base station via an access link connection. In other cases, the cancellation indication may be received from another UE. Based on the cancellation indication, the first UE 115-*l* may identify canceled sidelink resources based on the overlapping resources indicated in the cancellation indication. For example, the first UE 115-*l* may determine that sidelink communications are scheduled on a set of resources that overlap with resources scheduled for access link communications based on the cancellation indication. In this example, the first UE 115-*l* may be in-coverage with a serving base station and receive a cancellation indication via an access link, and the second UE 115-*m* and the third UE 115-*n* may be out of coverage for communications with the base station and thus may not receive a cancellation indication that is transmitted by the base station.

At 610, the first UE 115-*l* may transmit a cancellation notification via a sidelink message to the second UE 115-*m* and the third UE 115-*n*, and any other sidelink UEs that may be present in proximity to the first UE 115-*l*. In this example, the second UE 115-*m* may receive the cancellation notification, but the third UE 115-*n* may not successfully receive and decode the cancellation notification (e.g., due to interference in the transmission, poor channel conditions between the third UE 115-*n* and the first UE 115-*l*, etc.). The first UE 115-*l* may transmit the cancellation notification in accordance with techniques as discussed herein, such as by transmitting a PSBCH transmission that indicates the cancellation and may indicate one or more associated parameters (e.g., indication of resources, timing for the cancellation, priority associated with the cancellation, range/distance from a serving base station associated with the cancellation, a base station identification, etc.).

At 615, the second UE 115-*m* may receive the cancellation notification in the sidelink communications from the first UE 115-*l*, and may identify the canceled sidelink resources. In some cases, the second UE 115-*m* may identify the canceled resources based on overlapping resources indicated in the cancellation notification received from the first UE 115-*l*. For example, the second UE 115-*m* may determine that sidelink communications are scheduled on a set of resources that overlap with resources scheduled for access link communications based on the cancellation notification.

At 620, the first UE 115-*l* and the second UE 115-*m*, and any other sidelink UEs that received and decoded the cancellation notification, may refrain from communications on the canceled sidelink resources.

At 625, in this example, the third UE 115-*n* may transmit a sidelink transmission using the canceled sidelink resources. as discussed, in this example the third UE 115-*n* may not successfully decode the cancellation notification, and thus not identify the canceled sidelink resources.

At 630, the second UE 115-*m* may detect the sidelink transmission of the third UE 115-*n* on the canceled sidelink resources. In some cases, the second UE 115-*m* may monitor for sidelink communications on the canceled sidelink resources in order to help detect whether one or more sidelink UEs are continuing to transmit using the canceled sidelink resources.

At 635, the second UE 115-*m* may transmit a complaint message to the first UE 115-*l* that indicates a sidelink UE is transmitting using the canceled sidelink resources. In some cases, the second UE 115-*m* may decode all or a portion of the sidelink transmission of the third UE 115-*n* and identify a UE ID of the third UE 115-*n*, and provide the ID to the first UE 115-*l*. In some cases, the complaint message may include one or more parameters associated with the detected transmission such as, for example, an interference level, a percentage of the time/frequency resource used, or any combinations thereof. Optionally, at 640, the second UE 115-*m* may transmit the complaint message directly to the third UE 115-*n* (e.g., if the second UE 115-*m* decodes a UE-ID from the detected sidelink communication on the canceled sidelink resources).

At 645, the first UE 115-*l* may again transmit the cancellation notification, based on the complaint message from the second UE 115-*m*. At 650, the third UE 115-*n* may identify the canceled sidelink resources, and refrain from transmissions using the canceled resources. In some cases, the cancellation notification may be transmitted at a higher transmission power in order to increase the likelihood of receipt and successful decoding at the third UE 115-*n*. In other cases, additionally or alternatively, one or more other techniques may be used to enhance the likelihood of successful receipt of the cancellation notification, such as providing multiple repetitions of the cancellation notification, using a modulation and coding scheme that has a higher likelihood of receipt, more frequently broadcast the cancellation notification, or transmit a dedicated unicast transmission to the third UE 115-*n*, for example. In some cases, the first UE 115-*l* may broadcast resource reservation for all resources indicated in cancellation notification, or may transmit a SCI that preempts a resource reservation made by the third UE 115-*n* to thus prompt the third UE 115-*n* to change its resource reservation.

Implementing various aspects of the process flow 600 may allow for decreased interference between access links and sidelinks in wireless communications systems, and allow for propagation of a cancellation indication from a base station to one or more UEs 115 that may be out of coverage for communications with the base station.

Figure 7:
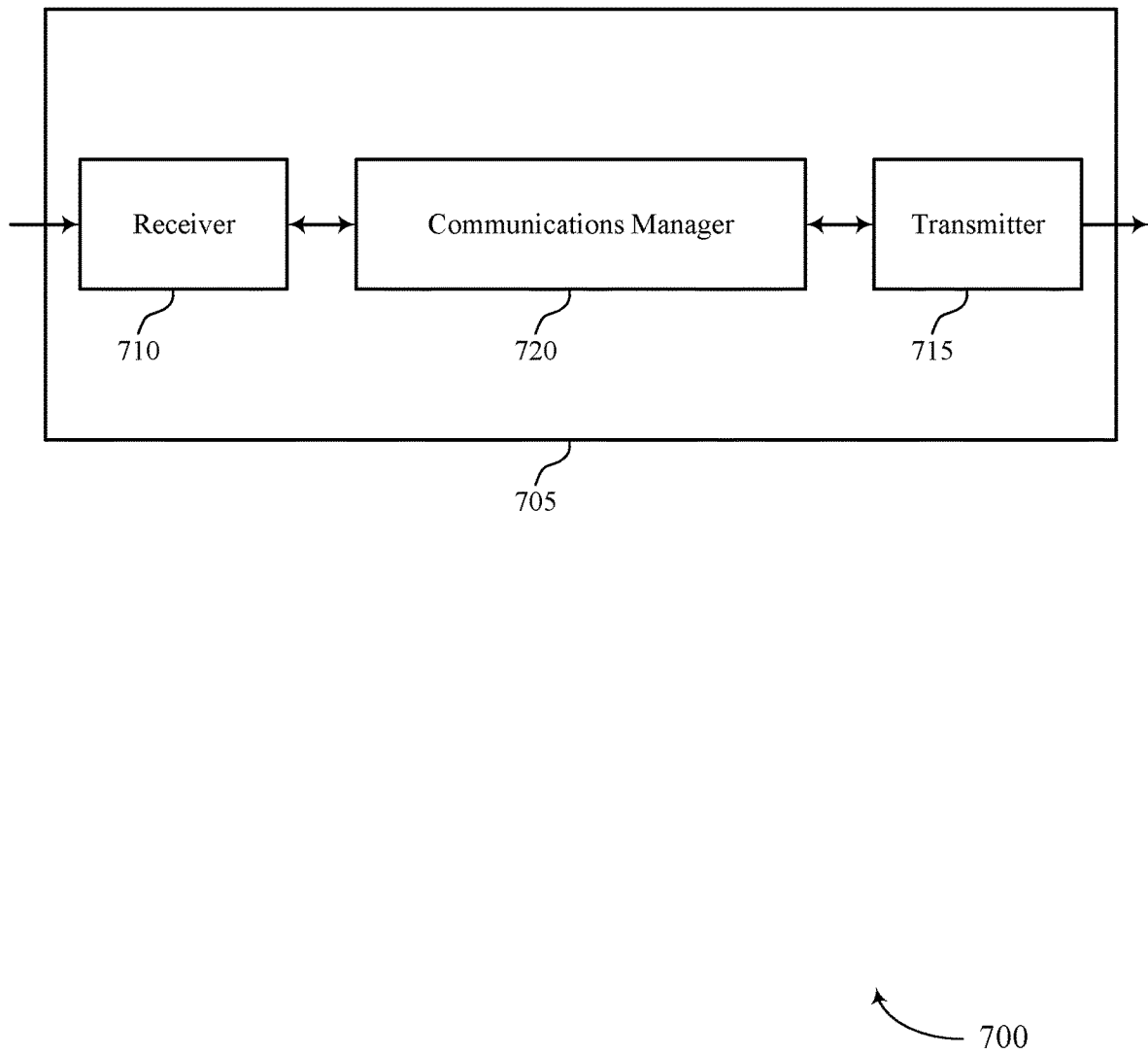
FIGS. 7 and 8 show block diagrams of devices that support sidelink cancellation for out of coverage user equipment in accordance with aspects of the present disclosure.

FIG. 7 shows a block diagram 700 of a device 705 that supports sidelink cancellation for out of coverage user equipment in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to sidelink cancellation for out of coverage user equipment). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to sidelink cancellation for out of coverage user equipment). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of sidelink cancellation for out of coverage user equipment as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. For example, the communications manager 720 may be configured as or otherwise support a means for receiving, from a base station, an indication of a canceled resource allocation that identifies at least a portion of a sidelink resource allocation for communications between the first UE and one or more other UEs is canceled, where the one or more other UEs include at least a second UE that is out of coverage for communications with the base station. The communications manager 720 may be configured as or otherwise support a means for transmitting, to at least the second UE, a sidelink communication that includes a notification of the canceled resource allocation.

Additionally or alternatively, the communications manager 720 may support wireless communications in accordance with examples as disclosed herein. For example, the communications manager 720 may be configured as or otherwise support a means for receiving a sidelink communication from a first UE at a second UE, the sidelink communication including a notification of a canceled resource allocation from a base station that cancels one or more resources for sidelink communications between a set of multiple sidelink UEs, where the set of multiple sidelink UEs include the first UE and the second UE, and the second UE is out of coverage for communications with the base station. The communications manager 720 may be configured as or otherwise support a means for canceling, basing at least in part on the notification, one or more sidelink communications with one or more of the set of multiple sidelink UEs.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for indicating cancellation of sidelink resources for out of coverage UEs, which may allow for efficient communication of a cancellation of all or a portion of allocated sidelink resources for sidelink UEs that may not have an access link connection with a serving base station. Using such techniques, the device 705 may exhibit improved reliability and reduced interference, among other benefits, which may reduce power consumption, increase battery life, and increase overall network latency and reliability.

Figure 8:
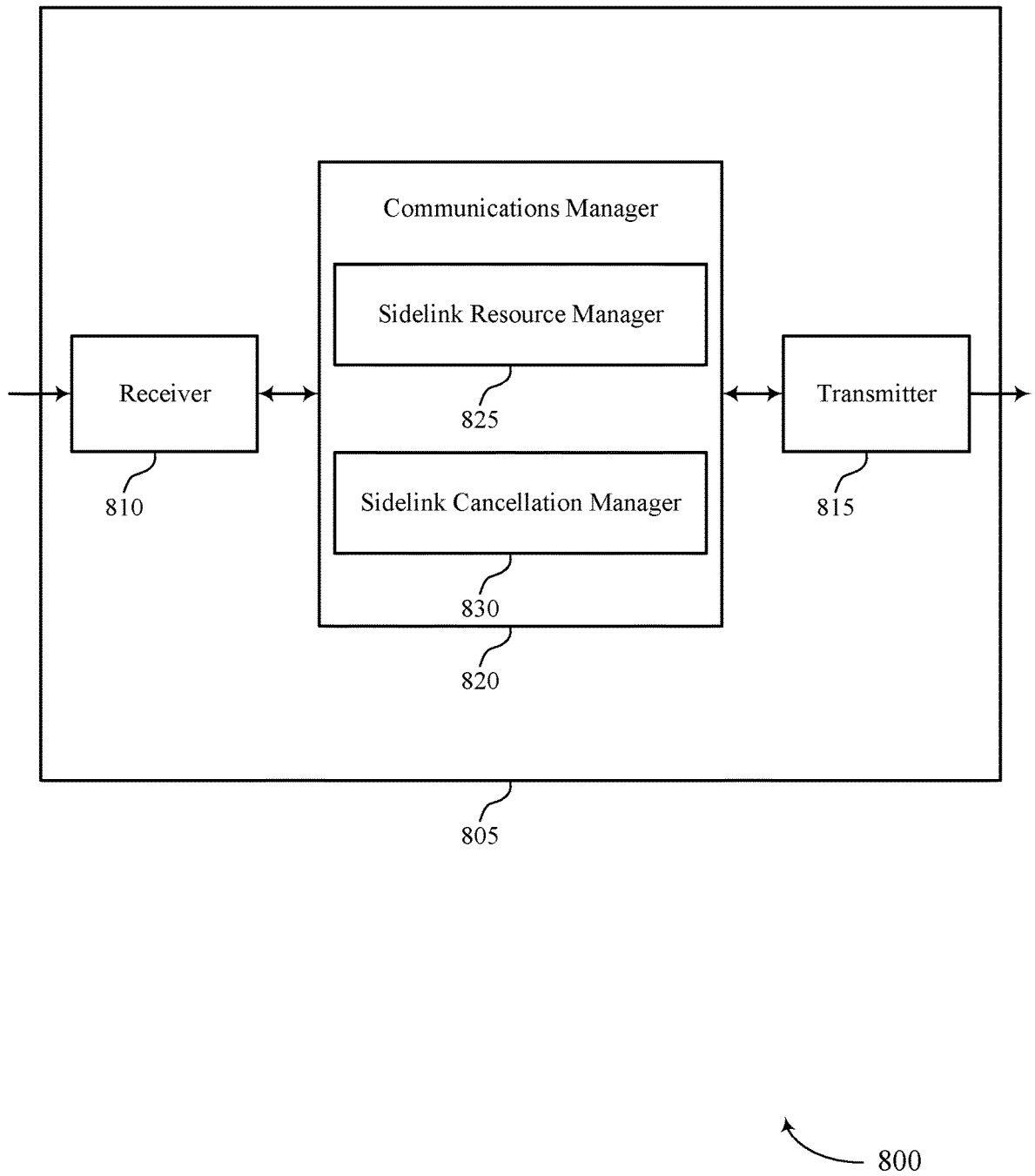

FIG. 8 shows a block diagram 800 of a device 805 that supports sidelink cancellation for out of coverage user equipment in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to sidelink cancellation for out of coverage user equipment). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to sidelink cancellation for out of coverage user equipment). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of sidelink cancellation for out of coverage user equipment as described herein. For example, the communications manager 820 may include a sidelink resource manager 825 a sidelink cancellation manager 830, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first UE in accordance with examples as disclosed herein. The sidelink resource manager 825 may be configured as or otherwise support a means for receiving, from a base station, an indication of a canceled resource allocation that identifies at least a portion of a sidelink resource allocation for communications between the first UE and one or more other UEs is canceled, where the one or more other UEs include at least a second UE that is out of coverage for communications with the base station. The sidelink cancellation manager 830 may be configured as or otherwise support a means for transmitting, to at least the second UE, a sidelink communication that includes a notification of the canceled resource allocation.

Additionally or alternatively, the communications manager 820 may support wireless communications in accordance with examples as disclosed herein. The sidelink resource manager 825 may be configured as or otherwise support a means for receiving a sidelink communication from a first UE at a second UE, the sidelink communication including a notification of a canceled resource allocation from a base station that cancels one or more resources for sidelink communications between a set of multiple sidelink UEs, where the set of multiple sidelink UEs include the first UE and the second UE, and the second UE is out of coverage for communications with the base station. The sidelink cancellation manager 830 may be configured as or otherwise support a means for canceling, based on the notification, one or more sidelink communications with one or more of the set of multiple sidelink UEs.

Figure 9:
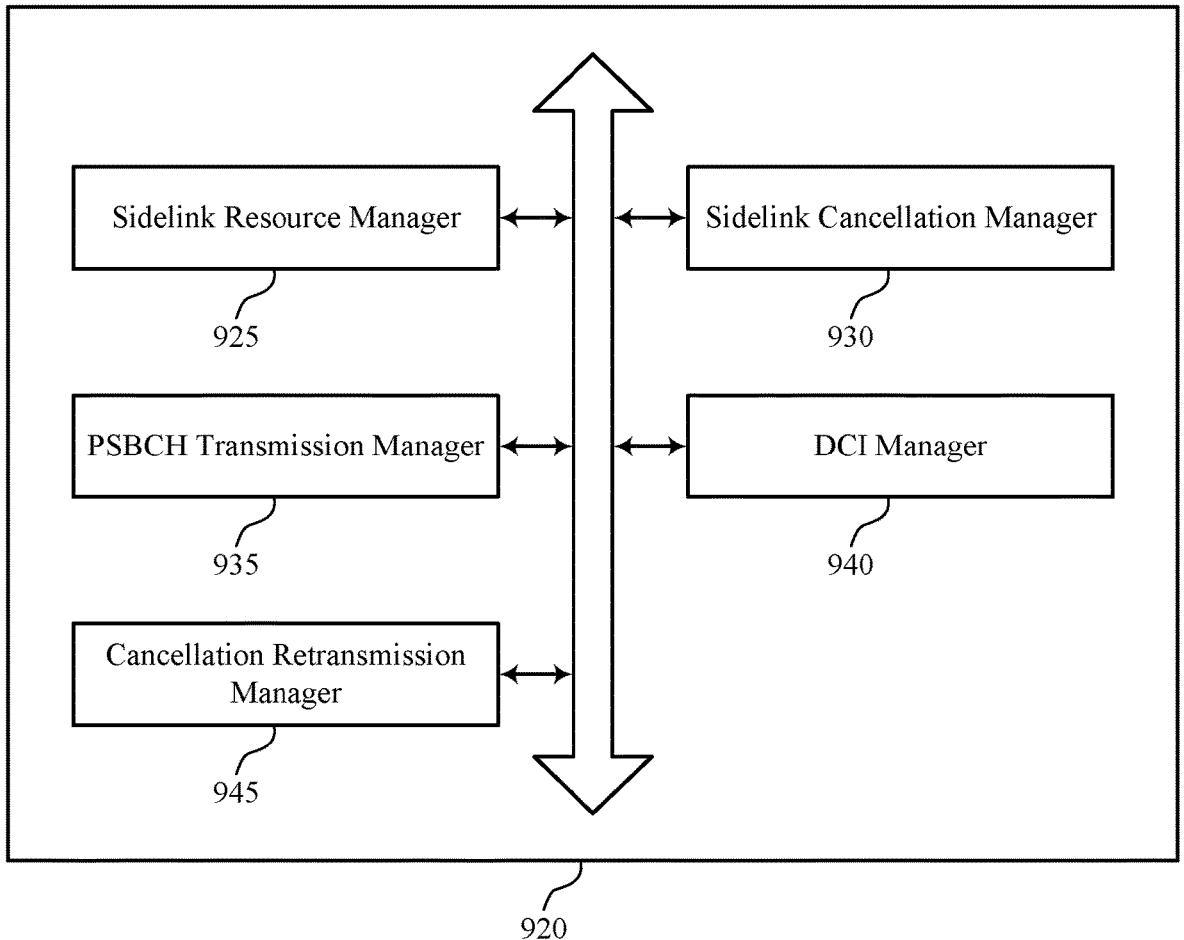
FIG. 9 shows a block diagram of a communications manager that supports sidelink cancellation for out of coverage user equipment in accordance with aspects of the present disclosure.

FIG. 9 shows a block diagram 900 of a communications manager 920 that supports sidelink cancellation for out of coverage user equipment in accordance with aspects of the present disclosure. The communications manager 920 may be an example of aspects of a communications manager 720, a communications manager 820, or both, as described herein. The communications manager 920, or various components thereof, may be an example of means for performing various aspects of sidelink cancellation for out of coverage user equipment as described herein. For example, the communications manager 920 may include a sidelink resource manager 925, a sidelink cancellation manager 930, an PSBCH transmission manager 935, a DCI manager 940, a cancellation retransmission manager 945, or any combination thereof. Each of these components may communicate, directly or indirectly, with one another (e.g., via one or more buses).

The communications manager 920 may support wireless communications at a first UE in accordance with examples as disclosed herein. The sidelink resource manager 925 may be configured as or otherwise support a means for receiving, from a base station, an indication of a canceled resource allocation that identifies at least a portion of a sidelink resource allocation for communications between the first UE and one or more other UEs is canceled, where the one or more other UEs include at least a second UE that is out of coverage for communications with the base station. The sidelink cancellation manager 930 may be configured as or otherwise support a means for transmitting, to at least the second UE, a sidelink communication that includes a notification of the canceled resource allocation.

In some examples, to support transmitting the sidelink communication, the sidelink cancellation manager 930 may be configured as or otherwise support a means for transmitting a sidelink broadcast communication to the one or more other UEs that indicates the canceled resource allocation. In some examples, the sidelink communication includes one or more of a distance from the base station that is associated with the canceled resource allocation, or an identification of the base station that provided the indication of the canceled resource allocation, for determination at the second UE of whether to cancel sidelink transmissions that use the canceled resource allocation.

In some examples, to support transmitting the sidelink communication, the sidelink cancellation manager 930 may be configured as or otherwise support a means for transmitting a physical sidelink broadcast channel (PSBCH) transmission that includes the notification of the canceled resource allocation and a PSBCH payload.

In some examples, to support transmitting the sidelink communication, the PSBCH transmission manager 935 may be configured as or otherwise support a means for transmitting a physical sidelink broadcast channel (PSBCH) transmission that includes a codepoint that identifies resources for a separate sidelink communication to be transmitted to the second UE. In some examples, to support transmitting the sidelink communication, the sidelink cancellation manager 930 may be configured as or otherwise support a means for transmitting the notification of the canceled resource allocation in the separate sidelink communication.

In some examples, to support receiving the indication of the canceled resource allocation, the DCI manager 940 may be configured as or otherwise support a means for receiving DCI from the base station that provides the indication of the canceled resource allocation. In some examples, decoded by a set of multiple UEs that are within coverage for communications with the base station. In some examples, decoded by only the first UE. In some examples, to remain in place until removed by the base station.

In some examples, to support receiving the indication of the canceled resource allocation, the sidelink resource manager 925 may be configured as or otherwise support a means for receiving a system information block from the base station that provides a modification to a sidelink resource pool configuration. In some examples, to support receiving the indication of the canceled resource allocation, the sidelink resource manager 925 may be configured as or otherwise support a means for receiving, from the base station, a medium access control (MAC) control element, RRC signaling, or combinations thereof, that provides the indication of the canceled resource allocation. In some examples, the MAC control element, the RRC signaling, or combinations thereof, are transmitted only when the indication of the canceled resource allocation is present or are transmitted periodically irrespective of whether the indication of the canceled resource allocation is present.

In some examples, an identification of sidelink resources that are canceled. In some examples, a duration of the canceled resource allocation. In some examples, a distance from the base station that is associated with the canceled resource allocation. In some examples, a type of communications associated with the canceled resource allocation. In some examples, a start and end time for the canceled resource allocation. In some examples, a sidelink UE behavior associated with the canceled resource allocation. In some examples, or any combinations thereof. In some examples, the notification of the canceled resource allocation is configured to be retransmitted by the second UE to at least a third UE that is out of coverage for communications with the base station. In some examples, the notification of the canceled resource allocation is transmitted to the second UE based on the second UE being a synchronization reference UE for sidelink communications, and where the notification of the canceled resource allocation is configured to be retransmitted in a physical sidelink broadcast channel (PSBCH) transmission from the second UE to at least the third UE.

In some examples, the sidelink cancellation manager 930 may be configured as or otherwise support a means for receiving a sidelink transmission from a third UE on sidelink resources associated with the canceled resource allocation. In some examples, the sidelink cancellation manager 930 may be configured as or otherwise support a means for transmitting a message to the third UE, or to a synchronization reference UE for sidelink communications, that indicates the third UE transmitted using the sidelink resources associated with the canceled resource allocation.

In some examples, the first UE is a synchronization reference UE, and the cancellation retransmission manager 945 may be configured as or otherwise support a means for receiving a message that indicates a third UE of the set of multiple sidelink UEs transmitted using the sidelink resources associated with the canceled resource allocation. In some examples, the first UE is a synchronization reference UE, and the cancellation retransmission manager 945 may be configured as or otherwise support a means for retransmitting the sidelink communication that includes the notification of the canceled resource allocation to at least the third UE, where the retransmitting is at a higher power than an initial power used for the sidelink communication.

Additionally or alternatively, the communications manager 920 may support wireless communications in accordance with examples as disclosed herein. In some examples, the sidelink resource manager 925 may be configured as or otherwise support a means for receiving a sidelink communication from a first UE at a second UE, the sidelink communication including a notification of a canceled resource allocation from a base station that cancels one or more resources for sidelink communications between a set of multiple sidelink UEs, where the set of multiple sidelink UEs include the first UE and the second UE, and the second UE is out of coverage for communications with the base station. In some examples, the sidelink cancellation manager 930 may be configured as or otherwise support a means for canceling, based on the notification, one or more sidelink communications with one or more of the set of multiple sidelink UEs.

In some examples, the PSBCH transmission manager 935 may be configured as or otherwise support a means for transmitting, to at least a third UE of the set of multiple sidelink UEs that is out of coverage for communications with the base station, a sidelink message that indicates the canceled resource allocation. In some examples, the sidelink message is transmitted by the second UE in a sidelink broadcast communication to the set of multiple sidelink UEs.

In some examples, the sidelink message is transmitted in a PSBCH transmission that includes the canceled resource allocation and a PSBCH payload. In some examples, the sidelink message is transmitted by the second UE in a PSBCH transmission that includes a codepoint that identifies resources for a separate sidelink communication. In some examples, the separate sidelink communication indicates the canceled resource allocation.

In some examples, the notification is transmitted to the second UE based on the second UE being a synchronization reference UE for sidelink communications, and the cancellation retransmission manager 945 may be configured as or otherwise support a means for receiving an indication that the third UE transmitted using the sidelink resources associated with the canceled resource allocation. In some examples, the notification is transmitted to the second UE based on the second UE being a synchronization reference UE for sidelink communications, and the cancellation retransmission manager 945 may be configured as or otherwise support a means for retransmitting, to at least the third UE, the sidelink communication that includes the notification of the canceled resource allocation, where the retransmitting is at a higher power than an initial power used for the sidelink message that indicates the canceled resource allocation.

In some examples, an identification of the one or more resources for sidelink communications that are canceled. In some examples, a duration of the canceled resource allocation. In some examples, a distance from the base station that is associated with the canceled resource allocation. In some examples, a type of communications associated with the canceled resource allocation. In some examples, a start and end time for the canceled resource allocation. In some examples, sidelink UE behavior associated with the canceled resource allocation. In some examples, or any combinations thereof. In some examples, the notification is received from the first UE in one or more of SCI, a MAC-CE, RRC signaling, or combinations thereof. In some examples, the notification is transmitted to the second UE based on the second UE being a synchronization reference UE for sidelink communications, and where the notification is configured to be retransmitted in a PSBCH transmission from the second UE to at least a third UE of the set of multiple sidelink UEs.

In some examples, the cancellation retransmission manager 945 may be configured as or otherwise support a means for determining that a third UE of the set of multiple sidelink UEs transmitted using sidelink resources associated with the canceled resource allocation. In some examples, the cancellation retransmission manager 945 may be configured as or otherwise support a means for transmitting a message to the third UE, or to a synchronization reference UE for sidelink communications, that indicates the third UE transmitted using the sidelink resources associated with the canceled resource allocation.

Figure 10:
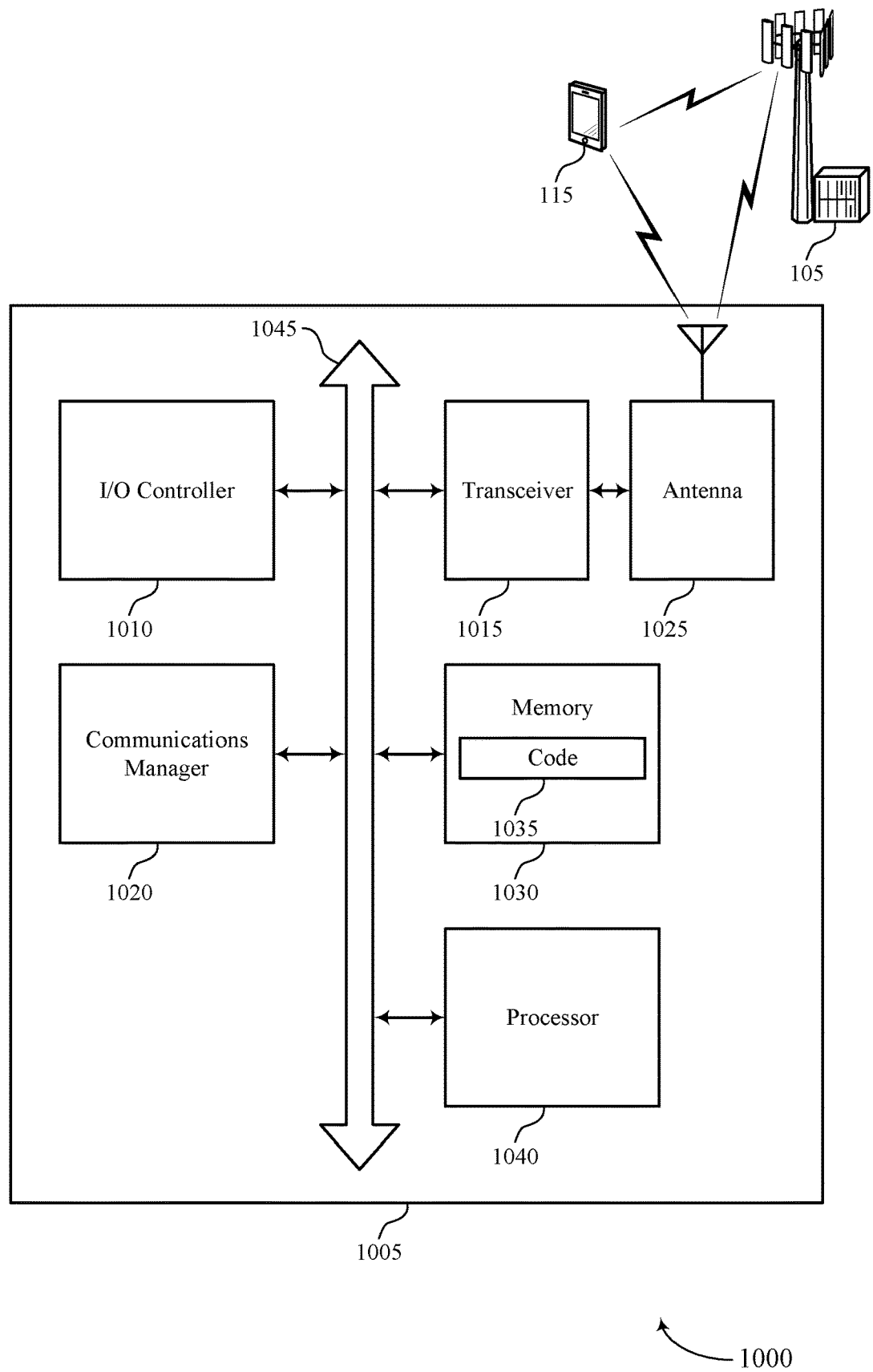
FIG. 10 shows a diagram of a system including a device that supports sidelink cancellation for out of coverage user equipment in accordance with aspects of the present disclosure.

FIG. 10 shows a diagram of a system 1000 including a device 1005 that supports sidelink cancellation for out of coverage user equipment in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting sidelink cancellation for out of coverage user equipment). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a first UE in accordance with examples as disclosed herein. For example, the communications manager 1020 may be configured as or otherwise support a means for receiving, from a base station, an indication of a canceled resource allocation that identifies at least a portion of a sidelink resource allocation for communications between the first UE and one or more other UEs is canceled, where the one or more other UEs include at least a second UE that is out of coverage for communications with the base station. The communications manager 1020 may be configured as or otherwise support a means for transmitting, to at least the second UE, a sidelink communication that includes a notification of the canceled resource allocation.

Additionally or alternatively, the communications manager 1020 may support wireless communications in accordance with examples as disclosed herein. For example, the communications manager 1020 may be configured as or otherwise support a means for receiving a sidelink communication from a first UE at a second UE, the sidelink communication including a notification of a canceled resource allocation from a base station that cancels one or more resources for sidelink communications between a set of multiple sidelink UEs, where the set of multiple sidelink UEs include the first UE and the second UE, and the second UE is out of coverage for communications with the base station. The communications manager 1020 may be configured as or otherwise support a means for canceling, basing at least in part on the notification, one or more sidelink communications with one or more of the set of multiple sidelink UEs.

By including or configuring the communications manager 1020 in accordance with examples as described herein, the device 1005 may support techniques for indicating cancellation of sidelink resources for out of coverage UEs, which may allow for efficient communication of a cancellation of all or a portion of allocated sidelink resources for sidelink UEs that may not have an access link connection with a serving base station. Using such techniques, the device 1005 may exhibit improved reliability and reduced interference, among other benefits, which may reduce power consumption, increase battery life, and increase overall network latency and reliability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of sidelink cancellation for out of coverage user equipment as described herein, or the processor 1040 and the memory 1030 may be otherwise configured to perform or support such operations.

Figure 11:
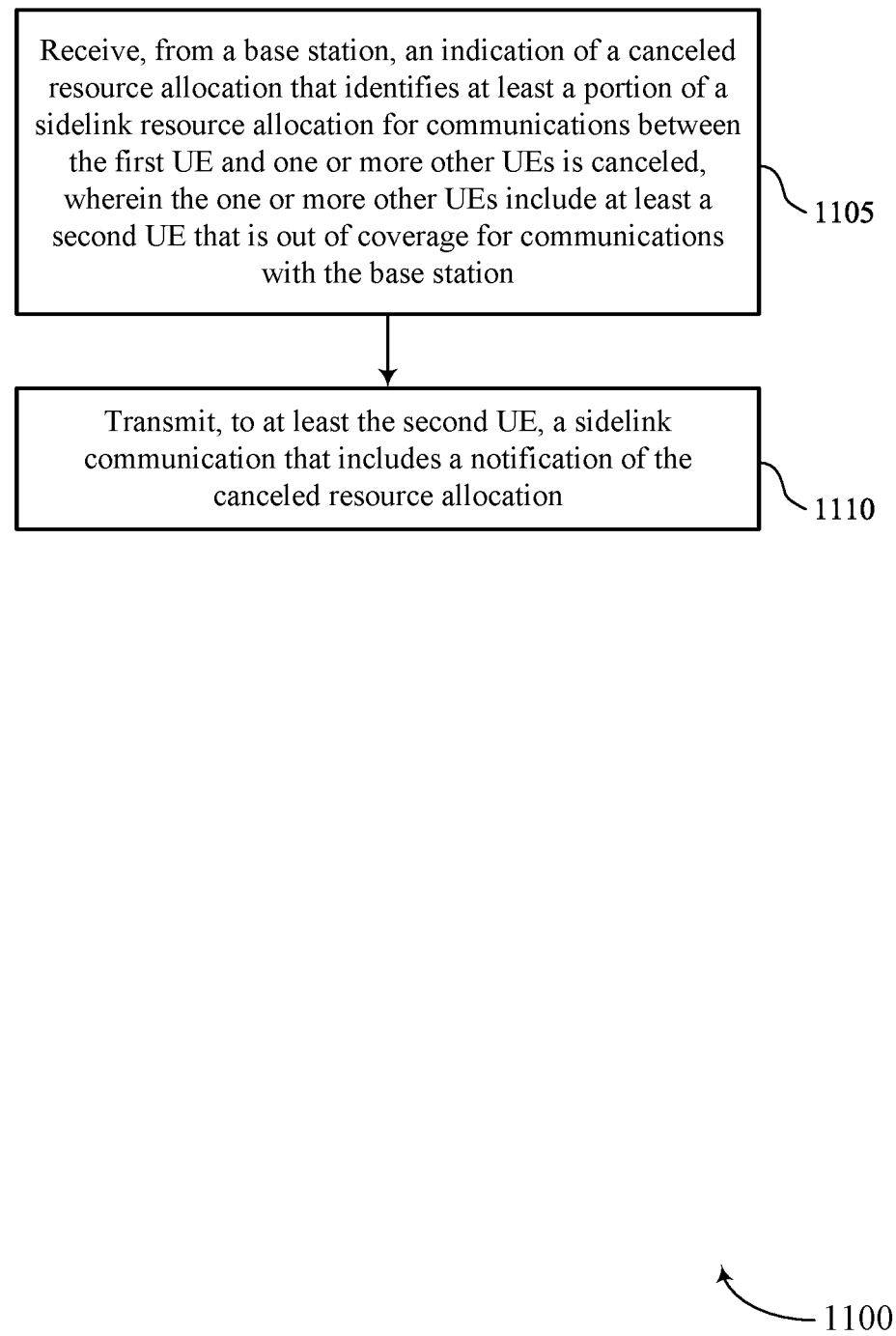
FIGS. 11 through 17 show flowcharts illustrating methods that support sidelink cancellation for out of coverage user equipment in accordance with aspects of the present disclosure.

FIG. 11 shows a flowchart illustrating a method 1100 that supports sidelink cancellation for out of coverage user equipment in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include receiving, from a base station, an indication of a canceled resource allocation that identifies at least a portion of a sidelink resource allocation for communications between the first UE and one or more other UEs is canceled, where the one or more other UEs include at least a second UE that is out of coverage for communications with the base station. The operations of 1105 may be performed in accordance with examples as disclosed herein. In some examples, aspects of the operations of 1105 may be performed by a sidelink resource manager 925 as described with reference to FIG. 9.

At 1110, the method may include transmitting, to at least the second UE, a sidelink communication that includes a notification of the canceled resource allocation. The operations of 1110 may be performed in accordance with examples as disclosed herein. In some examples, aspects of the operations of 1110 may be performed by a sidelink cancellation manager 930 as described with reference to FIG. 9. In some cases, the notification may be transmitted in a sidelink broadcast communication to the one or more other UEs that indicates the canceled resource allocation. In some cases, the broadcast communication may be a PSBCH transmission that includes the notification of the canceled resource allocation and a PSBCH payload.

Figure 12:
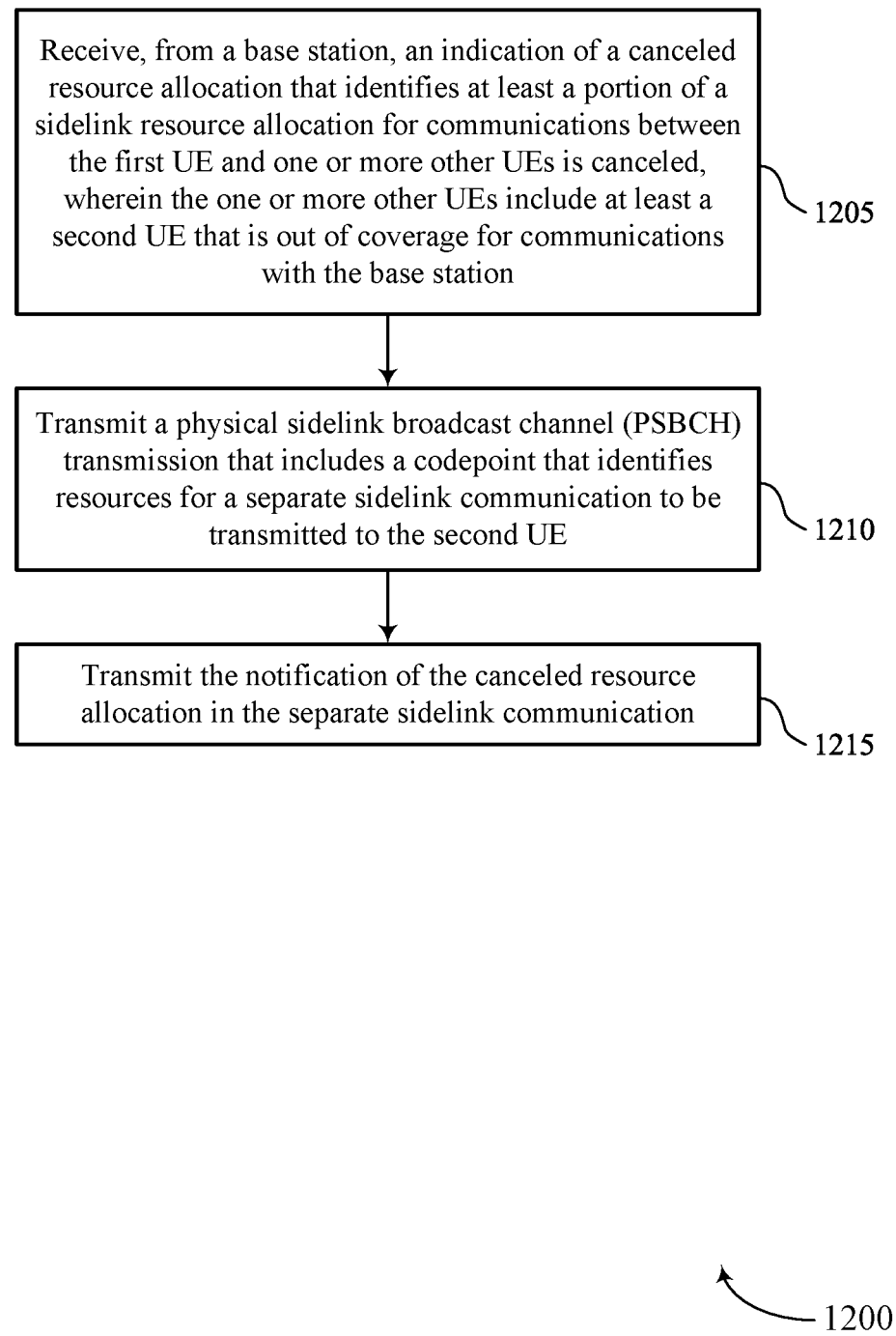

FIG. 12 shows a flowchart illustrating a method 1200 that supports sidelink cancellation for out of coverage user equipment in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, an indication of a canceled resource allocation that identifies at least a portion of a sidelink resource allocation for communications between the first UE and one or more other UEs is canceled, where the one or more other UEs include at least a second UE that is out of coverage for communications with the base station. The operations of 1205 may be performed in accordance with examples as disclosed herein. In some examples, aspects of the operations of 1205 may be performed by a sidelink resource manager 925 as described with reference to FIG. 9.

At 1210, the method may include transmitting a PSBCH transmission that includes a codepoint that identifies resources for a separate sidelink communication to be transmitted to the second UE. The operations of 1210 may be performed in accordance with examples as disclosed herein. In some examples, aspects of the operations of 1210 may be performed by an PSBCH transmission manager 935 as described with reference to FIG. 9.

At 1215, the method may include transmitting the notification of the canceled resource allocation in the separate sidelink communication. The operations of 1215 may be performed in accordance with examples as disclosed herein. In some examples, aspects of the operations of 1215 may be performed by a sidelink cancellation manager 930 as described with reference to FIG. 9.

Figure 13:
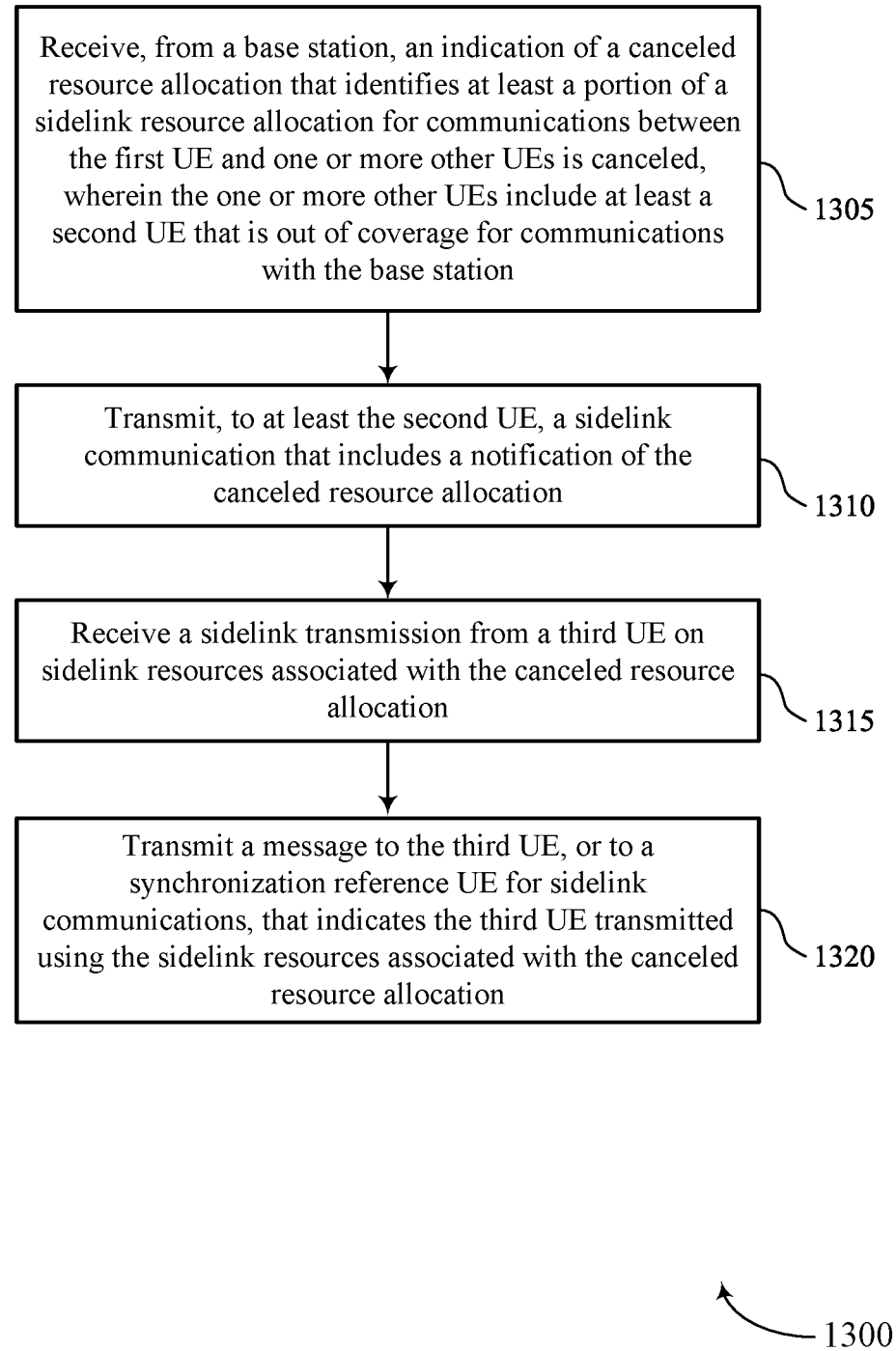

FIG. 13 shows a flowchart illustrating a method 1300 that supports sidelink cancellation for out of coverage user equipment in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, an indication of a canceled resource allocation that identifies at least a portion of a sidelink resource allocation for communications between the first UE and one or more other UEs is canceled, where the one or more other UEs include at least a second UE that is out of coverage for communications with the base station. The operations of 1305 may be performed in accordance with examples as disclosed herein. In some examples, aspects of the operations of 1305 may be performed by a sidelink resource manager 925 as described with reference to FIG. 9.

At 1310, the method may include transmitting, to at least the second UE, a sidelink communication that includes a notification of the canceled resource allocation. The operations of 1310 may be performed in accordance with examples as disclosed herein. In some examples, aspects of the operations of 1310 may be performed by a sidelink cancellation manager 930 as described with reference to FIG. 9.

At 1315, the method may include receiving a sidelink transmission from a third UE on sidelink resources associated with the canceled resource allocation. The operations of 1315 may be performed in accordance with examples as disclosed herein. In some examples, aspects of the operations of 1315 may be performed by a sidelink cancellation manager 930 as described with reference to FIG. 9.

At 1320, the method may include transmitting a message to the third UE, or to a synchronization reference UE for sidelink communications, that indicates the third UE transmitted using the sidelink resources associated with the canceled resource allocation. The operations of 1320 may be performed in accordance with examples as disclosed herein. In some examples, aspects of the operations of 1320 may be performed by a sidelink cancellation manager 930 as described with reference to FIG. 9.

Figure 14:
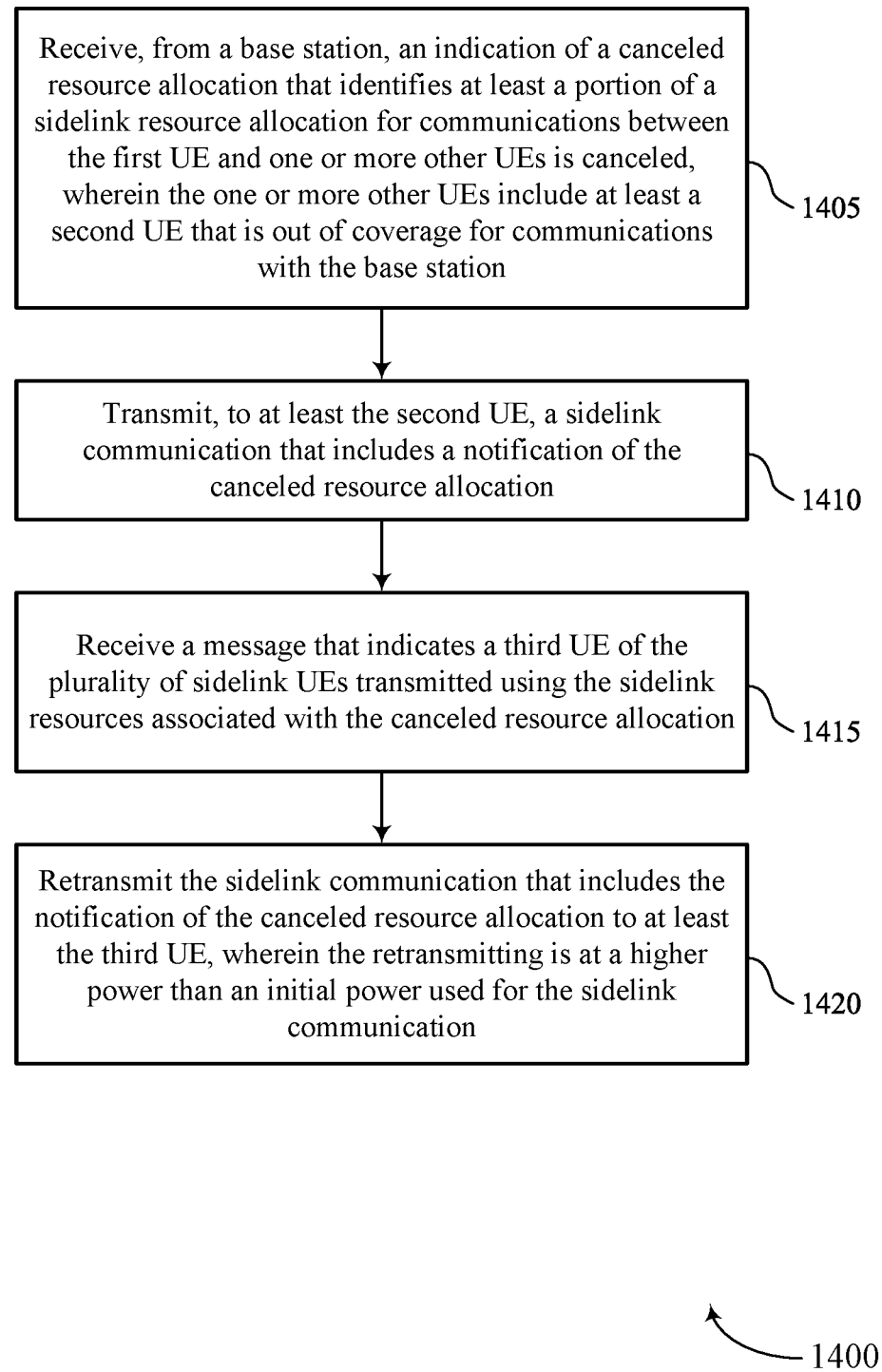

FIG. 14 shows a flowchart illustrating a method 1400 that supports sidelink cancellation for out of coverage user equipment in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, an indication of a canceled resource allocation that identifies at least a portion of a sidelink resource allocation for communications between the first UE and one or more other UEs is canceled, where the one or more other UEs include at least a second UE that is out of coverage for communications with the base station. The operations of 1405 may be performed in accordance with examples as disclosed herein. In some examples, aspects of the operations of 1405 may be performed by a sidelink resource manager 925 as described with reference to FIG. 9.

At 1410, the method may include transmitting, to at least the second UE, a sidelink communication that includes a notification of the canceled resource allocation. The operations of 1410 may be performed in accordance with examples as disclosed herein. In some examples, aspects of the operations of 1410 may be performed by a sidelink cancellation manager 930 as described with reference to FIG. 9.

At 1415, the method may include receiving a message that indicates a third UE of the set of multiple sidelink UEs transmitted using the sidelink resources associated with the canceled resource allocation. The operations of 1415 may be performed in accordance with examples as disclosed herein. In some examples, aspects of the operations of 1415 may be performed by a cancellation retransmission manager 945 as described with reference to FIG. 9.

At 1420, the method may include retransmitting the sidelink communication that includes the notification of the canceled resource allocation to at least the third UE, where the retransmitting is at a higher power than an initial power used for the sidelink communication. The operations of 1420 may be performed in accordance with examples as disclosed herein. In some examples, aspects of the operations of 1420 may be performed by a cancellation retransmission manager 945 as described with reference to FIG. 9.

Figure 15:
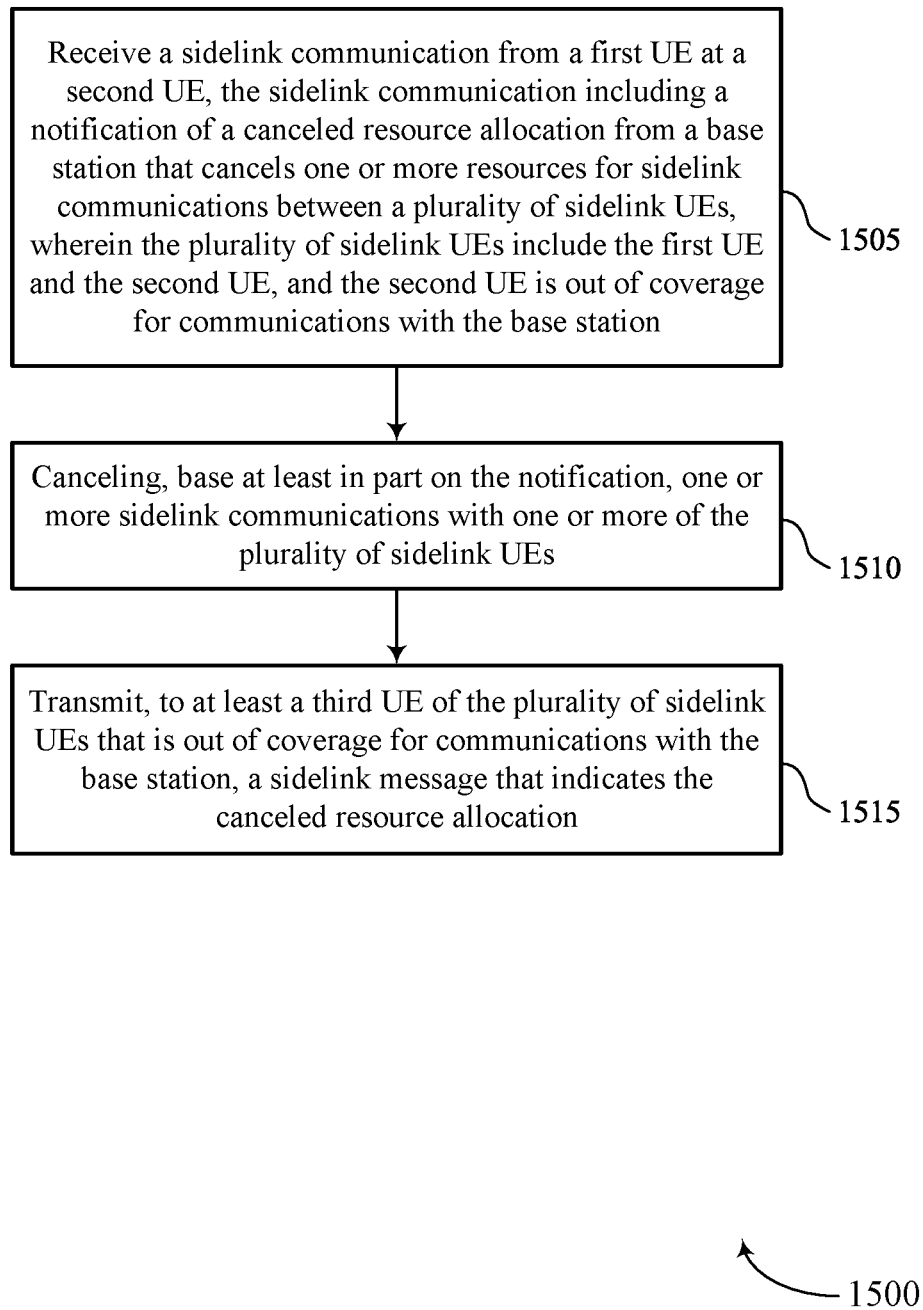

FIG. 15 shows a flowchart illustrating a method 1500 that supports sidelink cancellation for out of coverage user equipment in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving a sidelink communication from a first UE at a second UE, the sidelink communication including a notification of a canceled resource allocation from a base station that cancels one or more resources for sidelink communications between a set of multiple sidelink UEs, where the set of multiple sidelink UEs include the first UE and the second UE, and the second UE is out of coverage for communications with the base station. The operations of 1505 may be performed in accordance with examples as disclosed herein. In some examples, aspects of the operations of 1505 may be performed by a sidelink resource manager 925 as described with reference to FIG. 9.

At 1510, the method may include canceling, based on the notification, one or more sidelink communications with one or more of the set of multiple sidelink UEs. The operations of 1510 may be performed in accordance with examples as disclosed herein. In some examples, aspects of the operations of 1510 may be performed by a sidelink cancellation manager 930 as described with reference to FIG. 9.

At 1515, the method may include transmitting, to at least a third UE of the set of multiple sidelink UEs that is out of coverage for communications with the base station, a sidelink message that indicates the canceled resource allocation. The operations of 1515 may be performed in accordance with examples as disclosed herein. In some examples, aspects of the operations of 1515 may be performed by an PSBCH transmission manager 935 as described with reference to FIG. 9.

Figure 16:
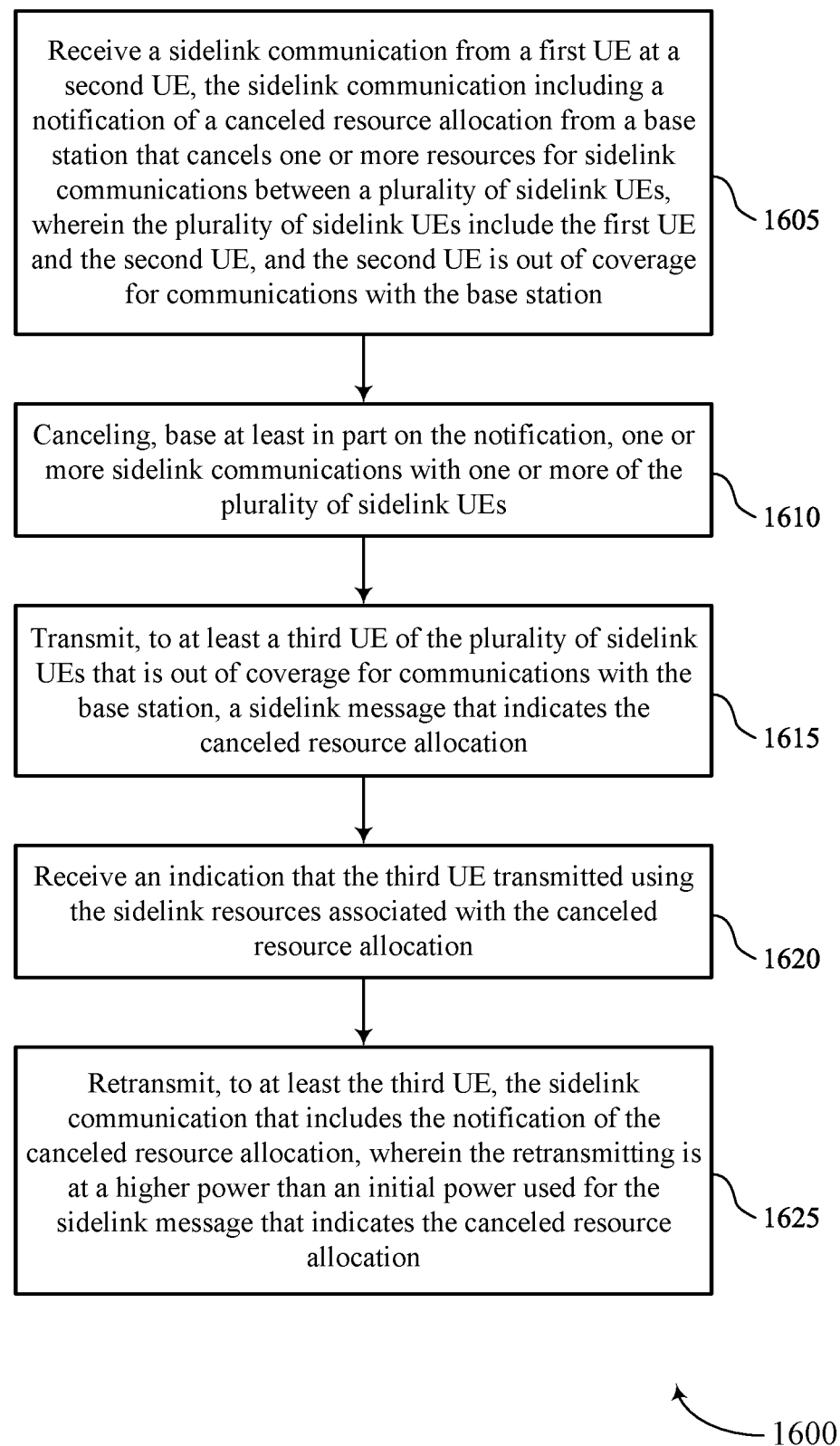

FIG. 16 shows a flowchart illustrating a method 1600 that supports sidelink cancellation for out of coverage user equipment in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving a sidelink communication from a first UE at a second UE, the sidelink communication including a notification of a canceled resource allocation from a base station that cancels one or more resources for sidelink communications between a set of multiple sidelink UEs, where the set of multiple sidelink UEs include the first UE and the second UE, and the second UE is out of coverage for communications with the base station. The operations of 1605 may be performed in accordance with examples as disclosed herein. In some examples, aspects of the operations of 1605 may be performed by a sidelink resource manager 925 as described with reference to FIG. 9.

At 1610, the method may include canceling, based on the notification, one or more sidelink communications with one or more of the set of multiple sidelink UEs. The operations of 1610 may be performed in accordance with examples as disclosed herein. In some examples, aspects of the operations of 1610 may be performed by a sidelink cancellation manager 930 as described with reference to FIG. 9.

At 1615, the method may include transmitting, to at least a third UE of the set of multiple sidelink UEs that is out of coverage for communications with the base station, a sidelink message that indicates the canceled resource allocation. The operations of 1615 may be performed in accordance with examples as disclosed herein. In some examples, aspects of the operations of 1615 may be performed by an PSBCH transmission manager 935 as described with reference to FIG. 9.

At 1620, the method may include receiving an indication that the third UE transmitted using the sidelink resources associated with the canceled resource allocation. The operations of 1620 may be performed in accordance with examples as disclosed herein. In some examples, aspects of the operations of 1620 may be performed by a cancellation retransmission manager 945 as described with reference to FIG. 9.

At 1625, the method may include retransmitting, to at least the third UE, the sidelink communication that includes the notification of the canceled resource allocation, where the retransmitting is at a higher power than an initial power used for the sidelink message that indicates the canceled resource allocation. The operations of 1625 may be performed in accordance with examples as disclosed herein. In some examples, aspects of the operations of 1625 may be performed by a cancellation retransmission manager 945 as described with reference to FIG. 9.

Figure 17:
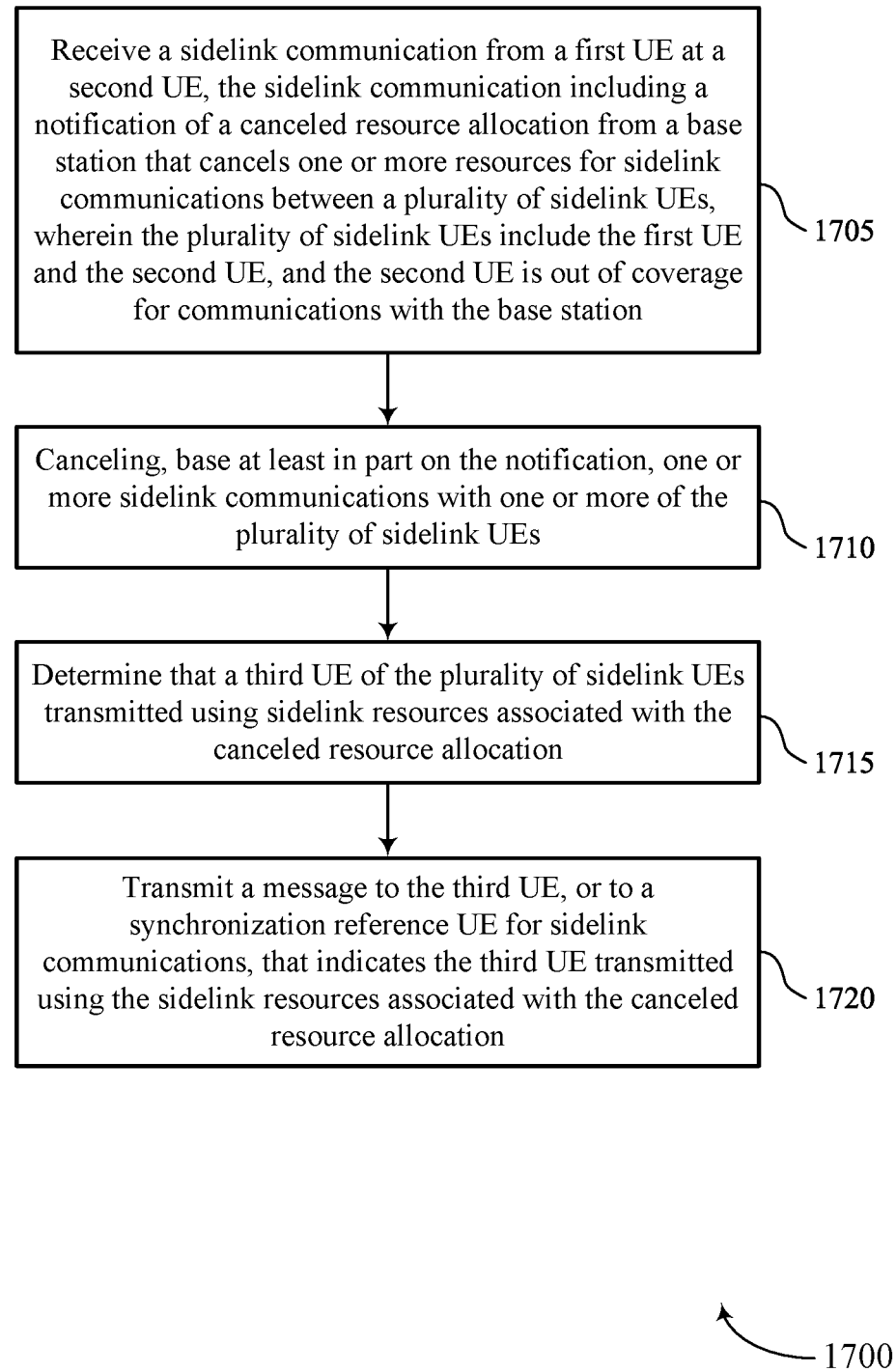

FIG. 17 shows a flowchart illustrating a method 1700 that supports sidelink cancellation for out of coverage user equipment in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving a sidelink communication from a first UE at a second UE, the sidelink communication including a notification of a canceled resource allocation from a base station that cancels one or more resources for sidelink communications between a set of multiple sidelink UEs, where the set of multiple sidelink UEs include the first UE and the second UE, and the second UE is out of coverage for communications with the base station. The operations of 1705 may be performed in accordance with examples as disclosed herein. In some examples, aspects of the operations of 1705 may be performed by a sidelink resource manager 925 as described with reference to FIG. 9.

At 1710, the method may include canceling, based on the notification, one or more sidelink communications with one or more of the set of multiple sidelink UEs. The operations of 1710 may be performed in accordance with examples as disclosed herein. In some examples, aspects of the operations of 1710 may be performed by a sidelink cancellation manager 930 as described with reference to FIG. 9.

At 1715, the method may include determining that a third UE of the set of multiple sidelink UEs transmitted using sidelink resources associated with the canceled resource allocation. The operations of 1715 may be performed in accordance with examples as disclosed herein. In some examples, aspects of the operations of 1715 may be performed by a cancellation retransmission manager 945 as described with reference to FIG. 9.

At 1720, the method may include transmitting a message to the third UE, or to a synchronization reference UE for sidelink communications, that indicates the third UE transmitted using the sidelink resources associated with the canceled resource allocation. The operations of 1720 may be performed in accordance with examples as disclosed herein. In some examples, aspects of the operations of 1720 may be performed by a cancellation retransmission manager 945 as described with reference to FIG. 9.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a first UE, comprising: receiving, from a base station, an indication of a canceled resource allocation that identifies at least a portion of a sidelink resource allocation for communications between the first UE and one or more other UEs is canceled, wherein the one or more other UEs include at least a second UE that is out of coverage for communications with the base station; and transmitting, to at least the second UE, a sidelink communication that includes a notification of the canceled resource allocation.

Aspect 2: The method of aspect 1, wherein the transmitting the sidelink communication comprises: transmitting a sidelink broadcast communication to the one or more other UEs that indicates the canceled resource allocation.

Aspect 3: The method of any of aspects 1 through 2, wherein the sidelink communication includes one or more of a distance from the base station that is associated with the canceled resource allocation, or an identification of the base station that provided the indication of the canceled resource allocation, for determination at the second UE of whether to cancel sidelink transmissions that use the canceled resource allocation.

Aspect 4: The method of any of aspects 1 through 3, wherein the transmitting the sidelink communication comprises: transmitting a physical sidelink broadcast channel (PSBCH) transmission that includes the notification of the canceled resource allocation and a PSBCH payload.

Aspect 5: The method of any of aspects 1 through 3, wherein the transmitting the sidelink communication comprises: transmitting a physical sidelink broadcast channel (PSBCH) transmission that includes a codepoint that identifies resources for a separate sidelink communication to be transmitted to the second UE; and transmitting the notification of the canceled resource allocation in the separate sidelink communication.

Aspect 6: The method of any of aspects 1 through 5, wherein the receiving the indication of the canceled resource allocation comprises: receiving DCI from the base station that provides the indication of the canceled resource allocation.

Aspect 7: The method of aspect 6, wherein a format of the DCI provides that the indication of the canceled resource allocation is decoded by a plurality of UEs that are within coverage for communications with the base station, decoded by only the first UE, or to remain in place until removed by the base station.

Aspect 8: The method of any of aspects 1 through 5, wherein the receiving the indication of the canceled resource allocation comprises: receiving a system information block from the base station that provides a modification to a sidelink resource pool configuration.

Aspect 9: The method of any of aspects 1 through 8, wherein the receiving the indication of the canceled resource allocation comprises: receiving, from the base station, a medium access control (MAC) control element, RRC signaling, or combinations thereof, that provides the indication of the canceled resource allocation.

Aspect 10: The method of aspect 9, wherein the MAC control element, the RRC signaling, or combinations thereof, are transmitted only when the indication of the canceled resource allocation is present or are transmitted periodically irrespective of whether the indication of the canceled resource allocation is present.

Aspect 11: The method of any of aspects 1 through 10, wherein the indication of the canceled resource allocation provides one or more of an identification of sidelink resources that are canceled, a duration of the canceled resource allocation, a distance from the base station that is associated with the canceled resource allocation, a type of communications associated with the canceled resource allocation, a start and end time for the canceled resource allocation, a sidelink UE behavior associated with the canceled resource allocation, or any combinations thereof.

Aspect 12: The method of any of aspects 1 through 11, wherein the notification of the canceled resource allocation is configured to be retransmitted by the second UE to at least a third UE that is out of coverage for communications with the base station.

Aspect 13: The method of aspect 12, wherein the notification of the canceled resource allocation is transmitted to the second UE based at least in part on the second UE being a synchronization reference UE for sidelink communications, and wherein the notification of the canceled resource allocation is configured to be retransmitted in a physical sidelink broadcast channel (PSBCH) transmission from the second UE to at least the third UE.

Aspect 14: The method of any of aspects 1 through 13, further comprising: receiving a sidelink transmission from a third UE on sidelink resources associated with the canceled resource allocation; and transmitting a message to the third UE, or to a synchronization reference UE for sidelink communications, that indicates the third UE transmitted using the sidelink resources associated with the canceled resource allocation.

Aspect 15: The method of any of aspects 1 through 13, wherein the first UE is a synchronization reference UE, and wherein the method further comprises: receiving a message that indicates a third UE of the plurality of sidelink UEs transmitted using the sidelink resources associated with the canceled resource allocation; and retransmitting the sidelink communication that includes the notification of the canceled resource allocation to at least the third UE, wherein the retransmitting is at a higher power than an initial power used for the sidelink communication.

Aspect 16: A method for wireless communications, comprising: receiving a sidelink communication from a first UE at a second UE, the sidelink communication including a notification of a canceled resource allocation from a base station that cancels one or more resources for sidelink communications between a plurality of sidelink UEs, wherein the plurality of sidelink UEs include the first UE and the second UE, and the second UE is out of coverage for communications with the base station; and canceling, based at least in part on the notification, one or more sidelink communications with one or more of the plurality of sidelink UEs.

Aspect 17: The method of aspect 16, further comprising: transmitting, to at least a third UE of the plurality of sidelink UEs that is out of coverage for communications with the base station, a sidelink message that indicates the canceled resource allocation.

Aspect 18: The method of aspect 17, wherein the sidelink message is transmitted by the second UE in a sidelink broadcast communication to the plurality of sidelink UEs.

Aspect 19: The method of aspect 18, wherein the sidelink message is transmitted in a physical sidelink broadcast channel (PSBCH) transmission that includes the canceled resource allocation and a PSBCH payload.

Aspect 20: The method of any of aspects 17 through 19, wherein the sidelink message is transmitted by the second UE in a physical sidelink broadcast channel (PSBCH) transmission that includes a codepoint that identifies resources for a separate sidelink communication, and the separate sidelink communication indicates the canceled resource allocation.

Aspect 21: The method of any of aspects 17 through 20, wherein the notification is transmitted to the second UE based at least in part on the second UE being a synchronization reference UE for sidelink communications, and wherein the method further comprises: receiving an indication that the third UE transmitted using the sidelink resources associated with the canceled resource allocation; and retransmitting, to at least the third UE, the sidelink communication that includes the notification of the canceled resource allocation, wherein the retransmitting is at a higher power than an initial power used for the sidelink message that indicates the canceled resource allocation.

Aspect 22: The method of any of aspects 16 through 21, wherein the sidelink communication from the first UE includes one or more of an identification of the one or more resources for sidelink communications that are canceled, a duration of the canceled resource allocation, a distance from the base station that is associated with the canceled resource allocation, a type of communications associated with the canceled resource allocation, a start and end time for the canceled resource allocation, sidelink UE behavior associated with the canceled resource allocation, or any combinations thereof.

Aspect 23: The method of any of aspects 16 through 22, wherein the notification is received from the first UE in one or more of sidelink control information (SCI), a medium access control (MAC) control element, RRC signaling, or combinations thereof.

Aspect 24: The method of any of aspects 16 through 23, wherein the notification is transmitted to the second UE based at least in part on the second UE being a synchronization reference UE for sidelink communications, and wherein the notification is configured to be retransmitted in a physical sidelink broadcast channel (PSBCH) transmission from the second UE to at least a third UE of the plurality of sidelink UEs.

Aspect 25: The method of any of aspects 16 through 24, further comprising: determining that a third UE of the plurality of sidelink UEs transmitted using sidelink resources associated with the canceled resource allocation; and transmitting a message to the third UE, or to a synchronization reference UE for sidelink communications, that indicates the third UE transmitted using the sidelink resources associated with the canceled resource allocation.

Aspect 26: An apparatus for wireless communications at a first UE, comprising a processor; memory coupled with the processor; and instructions stored in the memory and executable by the processor to cause the apparatus to perform a method of any of aspects 1 through 15.

Aspect 27: An apparatus for wireless communications at a first UE, comprising at least one means for performing a method of any of aspects 1 through 15.

Aspect 28: A non-transitory computer-readable medium storing code for wireless communications at a first UE, the code comprising instructions executable by a processor to perform a method of any of aspects 1 through 15.

Aspect 29: An apparatus for wireless communications, comprising a processor; memory coupled with the processor; and instructions stored in the memory and executable by the processor to cause the apparatus to perform a method of any of aspects 16 through 25.

Aspect 30: An apparatus for wireless communications, comprising at least one means for performing a method of any of aspects 16 through 25.

Aspect 31: A non-transitory computer-readable medium storing code for wireless communications, the code comprising instructions executable by a processor to perform a method of any of aspects 16 through 25.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
receiving, from an access network entity, an indication of a canceled resource allocation that identifies at least a portion of a sidelink resource allocation for communications between the first UE and one or more other UEs is canceled, wherein the one or more other UEs include at least a second UE that is out of coverage for communications with the access network entity; and
transmitting, to at least the second UE, a sidelink communication that includes a notification of the canceled resource allocation, wherein the sidelink communication includes one or more of a distance from the access network entity that is associated with the canceled resource allocation, or an identification of the access network entity that provided the indication of the canceled resource allocation, for determination at the second UE of whether to cancel sidelink transmissions that use the canceled resource allocation.

2. The method of claim 1, wherein the transmitting the sidelink communication comprises:
transmitting a sidelink broadcast communication to the one or more other UEs that indicates the canceled resource allocation.

3. The method of claim 1, wherein the transmitting the sidelink communication comprises:
transmitting a physical sidelink broadcast channel (PSBCH) transmission that includes the notification of the canceled resource allocation and a PSBCH payload.

4. The method of claim 1, wherein the transmitting the sidelink communication comprises:
transmitting a physical sidelink broadcast channel (PSBCH) transmission that includes a codepoint that identifies resources for a separate sidelink communication to be transmitted to the second UE; and
transmitting the notification of the canceled resource allocation in the separate sidelink communication.

5. The method of claim 1, wherein the receiving the indication of the canceled resource allocation comprises:
receiving downlink control information (DCI) from the access network entity that provides the indication of the canceled resource allocation.

6. The method of claim 5, wherein a format of the DCI provides that the indication of the canceled resource allocation is:
decoded by a plurality of UEs that are within coverage for communications with the access network entity,
decoded by only the first UE, or
to remain in place until removed by the access network entity.

7. The method of claim 1, wherein the receiving the indication of the canceled resource allocation comprises:
receiving a system information block from the access network entity that provides a modification to a sidelink resource pool configuration.

8. The method of claim 1, wherein the receiving the indication of the canceled resource allocation comprises:
receiving, from the access network entity, a medium access control (MAC) control element, radio resource control (RRC) signaling, or combinations thereof, that provides the indication of the canceled resource allocation.

9. The method of claim 8, wherein:
the MAC control element, the RRC signaling, or combinations thereof, are transmitted in response to determining that the indication of the canceled resource allocation is present, or are transmitted periodically irrespective of whether the indication of the canceled resource allocation is present.

10. The method of claim 1, wherein the indication of the canceled resource allocation provides one or more of:
an identification of sidelink resources that are canceled,
a duration of the canceled resource allocation,
a distance from the access network entity that is associated with the canceled resource allocation,
a type of communications associated with the canceled resource allocation,
a start and end time for the canceled resource allocation,
a sidelink UE behavior associated with the canceled resource allocation,
or any combinations thereof.

11. The method of claim 1, wherein:
the notification of the canceled resource allocation is configured to be retransmitted by the second UE to at least a third UE that is out of coverage for communications with the access network entity.

12. The method of claim 11, wherein:
the notification of the canceled resource allocation is transmitted to the second UE based at least in part on the second UE being a synchronization reference UE for sidelink communications, and wherein the notification of the canceled resource allocation is configured to be retransmitted in a physical sidelink broadcast channel (PSBCH) transmission from the second UE to at least the third UE.

13. The method of claim 1, further comprising:
receiving a sidelink transmission from a third UE on sidelink resources associated with the canceled resource allocation; and
transmitting a message to the third UE, or to a synchronization reference UE for sidelink communications, that indicates the third UE transmitted using the sidelink resources associated with the canceled resource allocation.

14. The method of claim 1, wherein the first UE is a synchronization reference UE, and wherein the method further comprises:
receiving a message that indicates a third UE of the one or more other UEs transmitted using sidelink resources associated with the canceled resource allocation; and
retransmitting the sidelink communication that includes the notification of the canceled resource allocation to at least the third UE, wherein the retransmitting is at a higher power than an initial power used for the sidelink communication.

15. A method for wireless communications, comprising:
receiving a sidelink communication from a first user equipment (UE) at a second UE, the sidelink communication including a notification of a canceled resource allocation from an access network entity that cancels one or more resources for sidelink communications between a plurality of sidelink UEs, wherein the plurality of sidelink UEs include the first UE and the second UE, and the second UE is out of coverage for communications with the access network entity;

canceling, based at least in part on the notification, one or more sidelink communications with one or more of the plurality of sidelink UEs; and
transmitting, to at least a third UE of the plurality of sidelink UEs that is out of coverage for communications with the access network entity, a sidelink message that indicates the canceled resource allocation.

16. The method of claim 15, wherein:
the sidelink message is transmitted by the second UE in a sidelink broadcast communication to the plurality of sidelink UEs.

17. The method of claim 16, wherein:
the sidelink message is transmitted in a physical sidelink broadcast channel (PSBCH) transmission that includes the canceled resource allocation and a PSBCH payload.

18. The method of claim 15, wherein:
the sidelink message is transmitted by the second UE in a physical sidelink broadcast channel (PSBCH) transmission that includes a codepoint that identifies resources for a separate sidelink communication, and the separate sidelink communication indicates the canceled resource allocation.

19. The method of claim 15, wherein the notification is transmitted to the second UE based at least in part on the second UE being a synchronization reference UE for sidelink communications, and wherein the method further comprises:
receiving an indication that the third UE transmitted using sidelink resources associated with the canceled resource allocation; and
retransmitting, to at least the third UE, the sidelink communication that includes the notification of the canceled resource allocation, wherein the retransmitting is at a higher power than an initial power used for the sidelink message that indicates the canceled resource allocation.

20. The method of claim 15, wherein the sidelink communication from the first UE includes one or more of:
an identification of the one or more resources for sidelink communications that are canceled,
a duration of the canceled resource allocation,
a distance from the access network entity that is associated with the canceled resource allocation,
a type of communications associated with the canceled resource allocation,
a start and end time for the canceled resource allocation,
sidelink UE behavior associated with the canceled resource allocation,
or any combinations thereof.

21. The method of claim 15, wherein:
the notification is received from the first UE in one or more of sidelink control information (SCI), a medium access control (MAC) control element, radio resource control (RRC) signaling, or combinations thereof.

22. The method of claim 15, wherein:
the notification is transmitted to the second UE based at least in part on the second UE being a synchronization reference UE for sidelink communications, and wherein the notification is configured to be retransmitted in a physical sidelink broadcast channel (PSBCH) transmission from the second UE to at least a third UE of the plurality of sidelink UEs.

23. The method of claim 15, further comprising:
determining that a third UE of the plurality of sidelink UEs transmitted using sidelink resources associated with the canceled resource allocation; and
transmitting a message to the third UE, or to a synchronization reference UE for sidelink communications, that indicates the third UE transmitted using the sidelink resources associated with the canceled resource allocation.

24. An apparatus for wireless communications at a first user equipment (UE), comprising:
a processor;
memory coupled with the processor; and
instructions stored in the memory and executable by the processor to cause the apparatus to:
receive, from an access network entity, an indication of a canceled resource allocation that identifies at least a portion of a sidelink resource allocation for communications between the first UE and one or more other UEs is canceled, wherein the one or more other UEs include at least a second UE that is out of coverage for communications with the access network entity; and
transmit, to at least the second UE, a sidelink communication that includes a notification of the canceled resource allocation, wherein the sidelink communication includes one or more of a distance from the access network entity that is associated with the canceled resource allocation, or an identification of the access network entity that provided the indication of the canceled resource allocation, for determination at the second UE of whether to cancel sidelink transmissions that use the canceled resource allocation.

25. The apparatus of claim 24, wherein the instructions to transmit the sidelink communication are executable by the processor to cause the apparatus to:
transmit a sidelink broadcast communication to the one or more other UEs that indicates the canceled resource allocation.

26. The apparatus of claim 24, wherein the instructions to transmit the sidelink communication are executable by the processor to cause the apparatus to:
transmit a physical sidelink broadcast channel (PSBCH) transmission that includes the notification of the canceled resource allocation and a PSBCH payload.

27. An apparatus for wireless communications, comprising:
a processor;
memory coupled with the processor; and
instructions stored in the memory and executable by the processor to cause the apparatus to:
receive a sidelink communication from a first user equipment (UE) at a second UE, the sidelink communication including a notification of a canceled resource allocation from an access network entity that cancels one or more resources for sidelink communications between a plurality of sidelink UEs, wherein the plurality of sidelink UEs include the first UE and the second UE, and the second UE is out of coverage for communications with the access network entity; and
canceling, base at least in part on the notification, one or more sidelink communications with one or more of the plurality of sidelink UEs; and
transmit, to at least a third UE of the plurality of sidelink UEs that is out of coverage for communications with the access network entity, a sidelink message that indicates the canceled resource allocation.

\* \* \* \* \*